(12) United States Patent
Tabata et al.

(10) Patent No.: US 7,544,140 B2
(45) Date of Patent: Jun. 9, 2009

(54) CONTROL DEVICE FOR VEHICULAR DRIVE SYSTEM

(75) Inventors: Atsushi Tabata, Okazaki (JP); Yutaka Taga, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 234 days.

(21) Appl. No.: 11/322,249

(22) Filed: Jan. 3, 2006

(65) Prior Publication Data

US 2007/0155583 A1      Jul. 5, 2007

(51) Int. Cl.
F16H 3/72         (2006.01)
(52) U.S. Cl. .......................................................... 475/5
(58) Field of Classification Search ...................... 475/5;
180/65.8; 903/930
See application file for complete search history.

(56) References Cited

U.S. PATENT DOCUMENTS

| 5,537,894 | A | 7/1996 | Chan |
| 2008/0070745 | A1* | 3/2008 | Ogata .......................... 477/15 |

FOREIGN PATENT DOCUMENTS

| JP | 4-58665 | U | * | 4/1992 |
| JP | 4-58665 | | | 5/1992 |
| JP | 07-042824 | | | 2/1995 |
| JP | 08-049763 | A | | 2/1996 |
| JP | 10-234105 | | | 9/1998 |
| JP | 11-217025 | | | 8/1999 |
| JP | 2000-2327 | | | 1/2000 |
| JP | 2000-346187 | | | 12/2000 |
| JP | 2003-130202 | | | 5/2003 |

* cited by examiner

*Primary Examiner*—Dirk Wright
(74) *Attorney, Agent, or Firm*—Oblon, Spivak, McClelland, Maier & Neustadt, P.C.

(57) ABSTRACT

A control device for a vehicular drive system including continuously-variable transmission portion 11 and step-variable transmission portion 20, wherein an emergency transmission control device is operated when one of the continuously-variable transmission portion 11 and step-variable transmission portion 20 fails to be normally operable, to change speed ratio of the other transmission portion such that overall speed ratio $\gamma T$ of the transmission mechanism 10 determined by the speed ratio $\gamma 0$ of the continuously-variable transmission portion 11 and speed ratio $\gamma$ of the step-variable transmission portion 20 is made equal to a value immediate before the above-indicated one transmission portion fails to be normally operable, so that a change of the overall speed ratio $\gamma T$ is reduced, whereby the vehicle can be run with high drivability.

53 Claims, 16 Drawing Sheets

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | |
| 2nd | ◎ | ○ | | | | ○ | | 2.180 | 1.54 |
| 3rd | ◎ | ○ | | | ○ | | | 1.424 | 1.53 |
| 4th | ◎ | ○ | ○ | | | | | 1.000 | 1.42 |
| 5th | | ○ | ○ | ◎ | | | | 0.705 | 1.42 |
| R | | | ○ | | | | ○ | 3.209 | SPREAD 4.76 |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | ○ | | | | | | | |

○ ENGAGED
◎ ENGAGED FOR STEP-VARIABLE SHIFTING, AND RELEASED FOR CONTINUOUSLY-VARIABLE SHIFTING

CONTROL DEVICE FOR VEHICULAR DRIVE SYSTEM

BACKGROUND OF THE INVENTION

1. Field of the Invention

The present invention relates to a control device for a vehicular drive system in which an output of a drive power source is transited to drive wheels of a vehicle through two transmission mechanisms, and more particularly to techniques for assuring high drivability of the vehicle when one of the two transmission mechanisms fails to be normally operable.

2 Discussion of the Related Art

There is known a vehicular drive system which includes two transmission mechanisms and in which an output of a drive power source is transmitted to drive wheels of a vehicle through the two transmission mechanisms. This vehicular drive system has an overall speed ratio determined by the speed ratios of the two transmission mechanisms.

Patent Document 1 discloses an example of a drive system for a hybrid vehicle, which is well known as a vehicular drive system including two transmission mechanisms as described above. The two transmission mechanisms provided in this vehicular drive system consist of an electrically controlled continuously variable transmission having a differential mechanism operable to distribute an output of an engine to a first electric motor and an output member, and a second electric motor disposed in a power transmitting path between the output member of the differential mechanism and the drive wheels of the vehicle, and a step-variable automatic transmission disposed in the power transmitting path. The electrically controlled continuously variable transmission is constituted by a planetary gear set, for example, and a major portion of a drive force of the engine is mechanically transmitted to the output member, through a differential function of the planetary gear set, while the remaining portion of the drive force of the engine is electrically transmitted from the first electric motor to the second electric motor through an electric path, whereby the speed ratio is electrically changed, so that the vehicle can be driven while the engine is held in an optimum operating state, with an improved fuel economy. The speed ratio of the step-variable automatic transmission permits the hybrid vehicle drive system to provide a vehicle drive force over a wide range of the overall speed ratio of the drive system, while minimizing the required size of the second electric motor.

[Patent Document 1] JP-2000-2327A
[Patent Document 2] JP-2000-346187A

Generally, a vehicular drive system is arranged such that in an abnormal or faulty state in which a transmission is not normally operable, the transmission is controlled to have a predetermined faulty-state speed ratio, to assure high drivability of the vehicle. This faulty-state speed ratio is selected to be relatively low for a relatively high output speed, for preventing an excessive engine braking effect during a high-speed running of the vehicle, and an excessively rise of an engine speed. Alternatively, the speed ratio established in the faulty state is selected to be relatively low for a relatively high output speed during the high-speed running of the vehicle, and to be relatively high for a relatively low output speed after an ignition switch is turned on, in order to obtain a sufficient vehicle drive force during starting of the vehicle or a low-speed running of the vehicle.

However, there is a possibility of deterioration of drivability of the vehicle due to a large difference of the faulty-state speed ratio with respect to the normal speed ratio established before detection of the faulty state, or due to a slow change of the speed ratio from the normal speed ratio to the faulty-state speed ratio upon detection of the faulty state. Where the drive system includes two transmission mechanisms as described above, there is also a possibility of deterioration of drivability of the vehicle in the faulty state of one of the two transmission mechanisms, in which the normally inoperable transmission is given a predetermined faulty-state speed ratio.

The present invention was made in view of the background situation described above. It is therefore an object of this invention to provide a control device for a vehicular drive system arranged to transmit an output of a drive power source to a drive wheel of a vehicle through two transmission mechanisms, which control device assures high drivability of the vehicle when one of the two transmission mechanisms fails to be normally operable.

The present invention defined in claim 1 provides a transmission portion and a second transmission portion and operable to transmit an output of a drive power source to a drive wheel of a vehicle through the first and second transmission portions, the control device comprising emergency transmission control means operable when one of the first and second transmission portions fails to be normally operable, the emergency transmission control means changing a speed ratio of the other of the first and second transmission portions.

In the above-described control device for a vehicular drive system including the first transmission portion and the second transmission portion, the emergency transmission control means is operated when one of the first and second transmission portions fails to be normally operable, so that the speed ratio of the other of the first and second transmission portions is changed by the emergency transmission control means. Accordingly, the emergency transmission control means reduces a change of the overall speed ratio of the drive system determined by the speed ratio of the first transmission portion and the speed ratio of the second transmission portion, thereby assuring high drivability of the vehicle. For example, the emergency transmission control means changes the speed ratio of the above-indicated other transmission portion such that the overall speed ratio of the drive system is made equal to a value immediately before the above-indicated one transmission portion fails to be normally operable.

According to the present invention defined in claim 2, a speed ratio of the first transmission portion and a speed ratio of the second transmission portion determine an overall speed ratio of the vehicular drive system, and the emergency transmission control means changes the speed ratio of the above-indicated other transmission portion such that the overall speed ratio of the vehicular drive system changes toward a value immediate before the above-indicated one transmission portion fails to be normally operable. In this arrangement, a change of the overall speed ratio of the drive system is reduced, so that the vehicle can be run with high drivability. Where the speed ratio of the normally inoperable one of the two transmission portions changes to a value for a relatively high output speed, for example, the emergency transmission control portion increases the speed ratio of the other transmission portion such that the overall speed ratio of the drive system is made equal to a value immediately before the above-indicated one transmission portion fails to be normally operable. Accordingly, the emergency transmission control means reduces an amount of reduction of a vehicle drive torque due to a change of the speed ratio of the normally inoperable transmission portion to the value for the relatively high output speed, thereby assuring high drivability of the vehicle. Where the speed ratio of the normally inoperable one of the two transmission portions changes to a value for a relatively low output speed, on the other hand, the emergency transmission control portion reduces the speed ratio of the other transmission portion such that the overall speed ratio of the drive system is made equal to the value immediately before the above-indicated one transmission portion fails to be normally operable. Accordingly, the emergency transmission control means reduces an engine braking effect generated due to a change of the speed ratio of the normally inoperable transmission portion to the value for the relatively low output speed, thereby assuring high drivability of the vehicle.

The present invention defined in claim 3 provides a control device for a vehicular drive system including a first transmission portion and a second transmission portion and operable to transmit an output of a drive power source to a drive wheel of a vehicle through the first and second transmission portions, the control device comprising emergency transmission control means operable when one of the first and second transmission portions fails to be normally operable, the emergency transmission control means placing the other of the first and second transmission portions in a neutral state in which a path of power transmission through the above-indicated other transmission portion is cut off.

In the above-described control device for a vehicular drive system including the first transmission portion and the second transmission portion, the emergency transmission control means is operated when one of the first and second transmission portions fails to be normally operable, so that the other of the first and second transmission portions is placed in its neutral state in which the path of power transmission through this other transmission portion is cut off. Accordingly, the emergency transmission control means prevents generation of an engine braking effect due to a change of the speed ratio of the normally inoperable transmission portion to a value for a relatively low output speed, or prevents an increase of the vehicle drive torque.

The present invention defined in claim 4 provides a control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including a step-variable transmission portion which constitutes a part of the power transmitting path and which functions as a step-variable automatic transmission, the control device comprising emergency transmission control means operable when one of the continuously-variable and step-variable transmission portions fails to be normally operable, the emergency transmission control means changing a speed ratio of the other of the continuously-variable and step-variable transmission portions.

In the above-described control device for a vehicular drive system including the continuously-variable transmission portion and the step-variable transmission portion, the emergency transmission control means is operated when one of the continuously-variable and step-variable transmission portions fails to be normally operable, so that the speed ratio of the other of the continuously-variable and step-variable transmission portions is changed by the emergency transmission control means. Accordingly, the emergency transmission control means reduces a change of the overall speed ratio of the drive system determined by the speed ratio of the continuously-variable transmission portion and the speed ratio of the step-variable transmission portion, thereby assuring high drivability of the vehicle. For example, the emergency transmission control means changes the speed ratio of the above-indicated other transmission portion such that the overall speed ratio of the drive system is made equal to a value immediately before the above-indicated one transmission portion fails to be normally operable.

According to the present invention defined in claim 5, a speed ratio of the continuously-variable transmission portion and a speed ratio of the step-variable transmission portion determine an overall speed ratio of the vehicular drive system, and the emergency transmission control means changes the speed ratio of the above-indicated other transmission portion such that the overall speed ratio of the vehicular drive system changes toward a value immediate before the above-indicated one transmission portion fails to be normally operable. In this arrangement, a change of the overall speed ratio of the drive system is reduced, so that the vehicle can be run with high drivability. Where the speed ratio of the normally inoperable one of the two transmission portions changes to a value for a relatively high output speed, for example, the emergency transmission control portion increases the speed ratio of the other transmission portion such that the overall speed ratio of the drive system is made equal to a value immediately before the above-indicated one transmission portion fails to be normally operable. Accordingly, the emergency transmission control means reduces an amount of reduction of a vehicle drive torque due to a change of the speed ratio of the normally inoperable transmission portion to the value for the relatively high output speed, thereby assuring high drivability of the vehicle. Where the speed ratio of the normally inoperable one of the two transmission portions changes to a value for a relatively low output speed, on the other hand, the emergency transmission control portion reduces the speed ratio of the other transmission portion such that the overall speed ratio of the drive system is made equal to the value immediately before the above-indicated one transmission portion fails to be normally operable. Accordingly, the emergency transmission control means reduces an engine braking effect generated due to a change of the speed ratio of the normally inoperable transmission portion to the value for the relatively low output speed, thereby assuring high drivability of the vehicle, or permits the drive system to provide a vehicle drive force over a wide range, by utilizing the speed ratio of the step-variable transmission portion, thereby increasing the operating efficiency of the electrically controlled continuously-variable transmission portion.

The present invention defined in claim 6 provides a control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including a step-variable transmission portion which constitutes a part of the power transmitting path and which functions as a step-variable automatic transmission, the control device comprising emergency transmission control means operable when one of the continuously-variable and step-variable transmission portions fails to be normally operable, the emergency transmission control means placing the other of the continuously-variable and step-variable transmission portions in a neutral state in which a path of power transmission through the above-indicated other transmission portion is cut off.

In the above-described control device for a vehicular drive system including the continuously-variable transmission portion and the step-variable transmission portion, the emergency transmission control means is operated when one of the continuously-variable and step-variable transmission portions fails to be normally operable, so that the other of the continuously-variable and step-variable transmission portions is placed in its neutral state in which the path of power transmission through this above-indicated other transmission portion is cut off. Accordingly, the emergency transmission control means prevents generation of an engine braking effect due to a change of the speed ratio of the normally inoperable transmission portion to a value for a relatively low output speed, or prevents an increase of the vehicle drive torque.

The present invention defined in claim 7 provides a control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including a step-variable transmission portion which constitutes a part of the power transmitting path and which functions as a step-variable automatic transmission, the control device comprising emergency transmission control means operable when the continuously-variable transmission portion fails to be normally operable, the emergency transmission control means changing a speed ratio of the step-variable transmission portion.

In the above-described control device for a vehicular drive system including the continuously-variable transmission portion and the step-variable transmission portion, the emergency transmission control means is operated when the continuously-variable transmission portion fails to be normally operable, so that the speed ratio of the step-variable transmission portion is changed by the emergency transmission control means. Accordingly, the emergency transmission control means reduces a change of the overall speed ratio of the drive system determined by the speed ratio of the continuously-variable transmission portion and the speed ratio of the step-variable transmission portion, thereby assuring high drivability of the vehicle. For example, the emergency transmission control means changes the speed ratio of the step-variable transmission portion such that the overall speed ratio of the drive system is made equal to a value immediately before the continuously-variable transmission portion fails to be normally operable.

According to the present invention defined in claim 8, the emergency transmission control means increases the speed ratio of the step-variable transmission portion when the continuously-variable transmission portion fails to be normally operable, with a result of a change of a speed ratio of the continuously-variable transmission portion to a value for a relatively high output speed. This arrangement is effective to reduce a change of the overall speed ratio of the drive system determined by the speed ratio of the continuously-variable transmission portion and the speed ratio of the step-variable transmission portion. Where the speed ratio of the continuously-variable transmission portion changes to a value for a relatively high output speed, the emergency transmission control portion increases the speed ratio of the step-variable transmission portion such that the overall speed ratio of the drive system is made equal to a value immediately before the continuously-variable transmission portion fails to be normally operable. Accordingly, the emergency transmission control means reduces an amount of reduction of the vehicle drive torque due to a change of the speed ratio of the normally inoperable transmission portion to the value for the relatively high output speed, thereby assuring high drivability of the vehicle.

According to the present invention defined in claim 9, the emergency transmission control means reduces the speed ratio of the step-variable transmission portion when the continuously-variable transmission portion fails to be normally operable, with a result of a change of a speed ratio of the continuously-variable transmission portion to a value for a relatively low output speed. This arrangement is effective to reduce a change of the overall speed ratio of the drive system determined by the speed ratio of the continuously-variable transmission portion and the speed ratio of the step-variable transmission portion. Where the speed ratio of the continuously-variable transmission portion changes to a value for a relatively low output speed, the emergency transmission control portion reduces the speed ratio of the step-variable transmission portion such that the overall speed ratio of the drive system is made equal to the value immediately before the continuously-variable transmission portion fails to be normally operable. Accordingly, the emergency transmission control means reduces an engine braking effect generated due to a change of the speed ratio of the normally inoperable continuously-variable transmission portion to the value for the relatively low output speed, thereby assuring high drivability of the vehicle.

The present invention defined in claim 10 provides a control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including a step-variable transmission portion which constitutes a part of the power transmitting path and which functions as a step-variable automatic transmission, said control device comprising emergency transmission control means operable when the continuously-variable transmission portion fails to be normally operable, the emergency transmission control means placing the step-variable transmission portion in a neutral state in which a path of power transmission through the step-variable transmission portion is cut off.

In the above-described control device for a vehicular drive system including the continuously-variable transmission portion and the step-variable transmission portion, the emergency transmission control means is operated when the continuously-variable transmission portion fails to be normally operable, so that the step-variable transmission portion is placed in its neutral state in which the path of power transmission through this step-variable transmission portion is cut off. Accordingly, the emergency transmission control means prevents generation of an engine braking effect due to a change of the speed ratio of the normally inoperable continuously-variable transmission portion to a value for a relatively low output speed, or prevents an increase of the vehicle drive torque.

The present invention defined in claim 11 provides a control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including a step-variable transmission portion which constitutes a part of the power transmitting path and which functions as a step-variable automatic transmission, the control device comprising emergency transmission control means operable when the step-variable transmission portion fails to be normally operable, the emergency transmission control means changing a speed ratio of the continuously-variable transmission portion.

In the above-described control device for a vehicular drive system including the continuously-variable transmission portion and the step-variable transmission portion, the emergency transmission control means is operated when the step-variable transmission portion fails to be normally operable, so that the speed ratio of the continuously-variable transmission portion is changed by the emergency transmission control means. Accordingly, the emergency transmission control means reduces a change of the overall speed ratio of the drive system determined by the speed ratio of the continuously-variable transmission portion and the speed ratio of the step-variable transmission portion, thereby assuring high drivability of the vehicle. For example, the emergency transmission control means changes the speed ratio of the continuously-variable transmission portion such that the overall speed ratio of the drive system is made equal to a value immediately before the step-variable transmission portion fails to be normally operable.

According to the present invention defined in claim 12, the emergency transmission control means increases the speed ratio of the continuously-variable transmission portion when the step-variable transmission portion fails to be normally operable, with a result of a change of a speed ratio of the step-variable transmission portion to a value for a relatively high output speed. This arrangement is effective to reduce a change of the overall speed ratio of the drive system determined by the speed ratio of the continuously-variable transmission portion and the speed ratio of the step-variable transmission portion. Where the speed ratio of the step-variable transmission portion changes to a value for a relatively high output speed, the emergency transmission control portion increases the speed ratio of the continuously-variable transmission portion such that the overall speed ratio of the drive system is made equal to a value immediately before the step-variable transmission portion fails to be normally operable. Accordingly, the emergency transmission control means reduces an amount of reduction of the vehicle drive torque due to a change of the speed ratio of the normally inoperable step-variable transmission portion to the value for the relatively high output speed, thereby assuring high drivability of the vehicle.

According to the present invention defined in claim 13, the emergency transmission control means reduces the speed ratio of the continuously-variable transmission portion when the step-variable transmission portion fails to be normally operable, with a result of a change of a speed ratio of the step-variable transmission portion to a value for a relatively low output speed. This arrangement is effective to reduce a change of the overall speed ratio of the drive system determined by the speed ratio of the continuously-variable transmission portion and the speed ratio of the step-variable transmission portion. Where the speed ratio of the step-variable transmission portion changes to a value for a relatively low output speed, the emergency transmission control portion reduces the speed ratio of the continuously-variable transmission portion such that the overall speed ratio of the drive system is made equal to the value immediately before the step-variable transmission portion fails to be normally operable. Accordingly, the emergency transmission control means reduces an engine braking effect generated due to a change of the speed ratio of the normally inoperable step-variable transmission portion to the value for the relatively low output speed, thereby assuring high drivability of the vehicle.

The present invention defined in claim 14 provides a control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including a step-variable transmission portion which constitutes a part of the power transmitting path and which functions as a step-variable automatic transmission, said control device comprising emergency transmission control means operable when the step-variable transmission portion fails to be normally operable, the emergency transmission control means placing the continuously-variable transmission portion in a neutral state in which a path of power transmission through the continuously-variable transmission portion is cut off In the above-described control device for a vehicular drive system including the continuously-variable transmission portion and the step-variable transmission portion, the emergency transmission control means is operated when the step-variable transmission portion fails to be normally operable, so that the continuously-variable transmission portion is placed in its neutral state in which the path of power transmission through this continuously-variable transmission portion is cut off. Accordingly, the emergency transmission control means prevents generation of an engine braking effect due to a change of the speed ratio of the normally inoperable step-variable transmission portion to a value for a relatively low output speed, or prevents an increase of the vehicle drive torque.

In a preferred form of the vehicular drive system according to any one of claims 4-14, the differential mechanism includes a differential-state switching device operable to place the differential mechanism selectively into a continuously-variable shifting state in which the continuously-variable transmission portion is operable as an electrically controlled continuously variable transmission, and a step-variable shifting state in which the continuously-variable transmission portion is not operable as the electrically controlled transmission. In this arrangement, the continuously-variable transmission portion can be easily switched between the continuously-variable shifting state and the step-variable shifting state.

Preferably, the differential-state switching device is operable to place the differential mechanism in a differential state in which the differential mechanism is operable to perform a differential function, whereby the continuously-variable transmission portion is placed in the continuously-variable shifting state, and to place the differential mechanism in a locked state in which the differential mechanism is not operable to perform the differential function, whereby the continuously-variable transmission portion is placed in the step-variable shifting state. Thus, the continuously-variable transmission portion is switchable between the continuously-variable shifting state and the step-variable shifting state.

Preferably, the differential mechanism includes a first element fixed to the engine, a second element fixed to the first electric motor, and a third element fixed to the power distributing member, and the above-indicated differential-state switching device is operable to permit the first, second and third elements to be rotated relative to each other, for thereby placing the differential mechanism in the continuously-variable shifting state, and to connect the first, second and third elements for rotation as a unit or to hold the second element stationary, for thereby placing the differential mechanism in the step-variable shifting state. In this arrangement, the continuously-variable transmission portion can be switched between the continuously-variable shifting state and the step-variable shifting state.

Preferably, the differential-state switching device includes a clutch operable to connect at least two of the first, second and third elements to each other for rotation of the first, second and third elements as a unit, and/or a brake operable to fix the second element to a stationary member for holding the second element stationary. In this arrangement, the continuously-variable transmission portion can be easily switched between the continuously-variable shifting state and the step-variable shifting state.

Preferably, the above-described clutch and the brake are released to place the differential mechanism is placed in the differential state in which the first, second and third elements are rotatable relative to each other. Further, the differential mechanism is enabled to function as a transmission having a speed ratio of 1 when the clutch is engaged, or as a speed-increasing transmission having a speed ratio lower than 1 when the brake is engaged. In this case, the differential mechanism can be switched between the differential state and the locked state, and can function as a transmission having one speed position with a fixed speed ratio or a plurality of speed positions with respective fixed speed ratios.

Preferably, the differential mechanism is a planetary gear set, and the above-described first, second and third elements are respectively a carrier, a sun gear and a ring gear of the planetary gear set. In this case, the required axial dimension of the differential mechanism can be reduced. Further, the differential mechanism can be simply constituted by one planetary gear set.

Preferably, the above-described planetary gear set is of a single-pinion type. In this case, the required axial dimension of the differential mechanism can be reduced. Further, the differential mechanism can be simply constituted by one planetary gear set of a single-pinion type.

In a preferred form of the present invention defined in any one of claims 7-14, the vehicular drive system has an overall speed ratio which is determined by the speed ratio of the step-variable transmission portion and the speed ratio of the continuously-variable transmission portion. In this case, the vehicular drive system provides a vehicle drive force over a wide range, by utilizing the speed ratio of the step-variable transmission portion, so that the continuously-variable transmission portion can be operated with increased operating efficiency as the electrically controlled transmission.

BRIEF DESCRIPTION OF THE DRAWINGS

The above and other objects, features, advantages and industrial significance of the present invention will be better understood by reading the following detailed description of preferred embodiments of this invention, when taken in connection with the accompanying drawings, in which.

DETAILED DESCRIPTION OF THE PREFERRED EMBODIMENTS

Figures 1, 2:
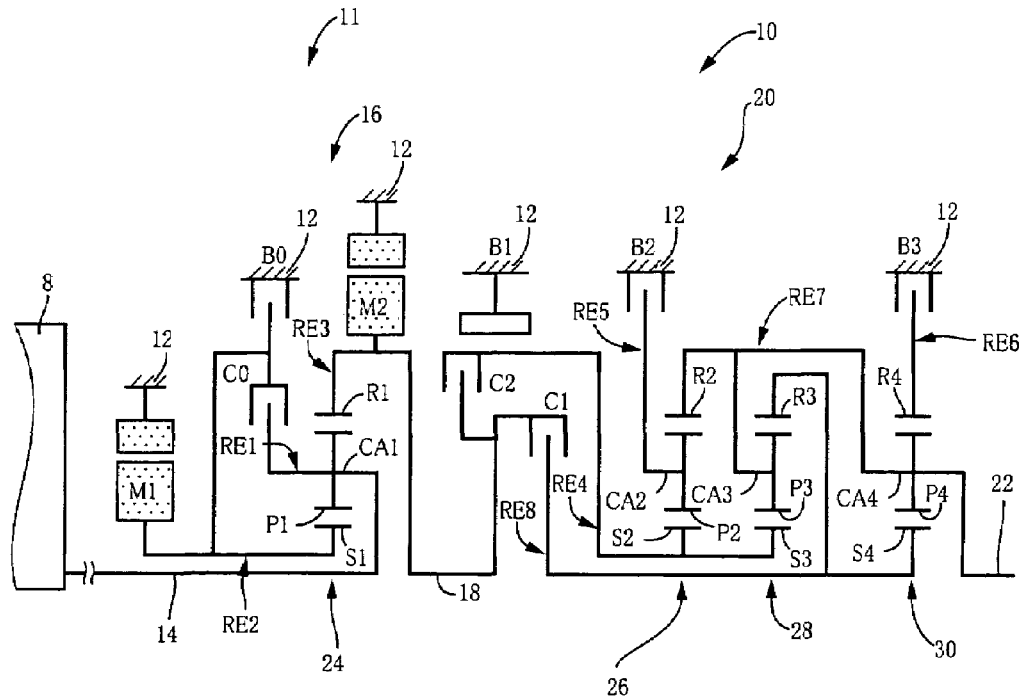
FIG. 1 is a schematic view showing an arrangement of a drive system for a hybrid vehicle, which is constructed according to one embodiment of the present invention.
FIG. 2 is a table indicating shifting actions of the hybrid vehicle drive system of the embodiment of FIG. 1, which is operable in a selected one of a continuously-variable shifting state and a step-variable shifting state, in relation to different combinations of operating states of hydraulically operated frictional coupling devices to effect the respective shifting actions.
Figure 5:
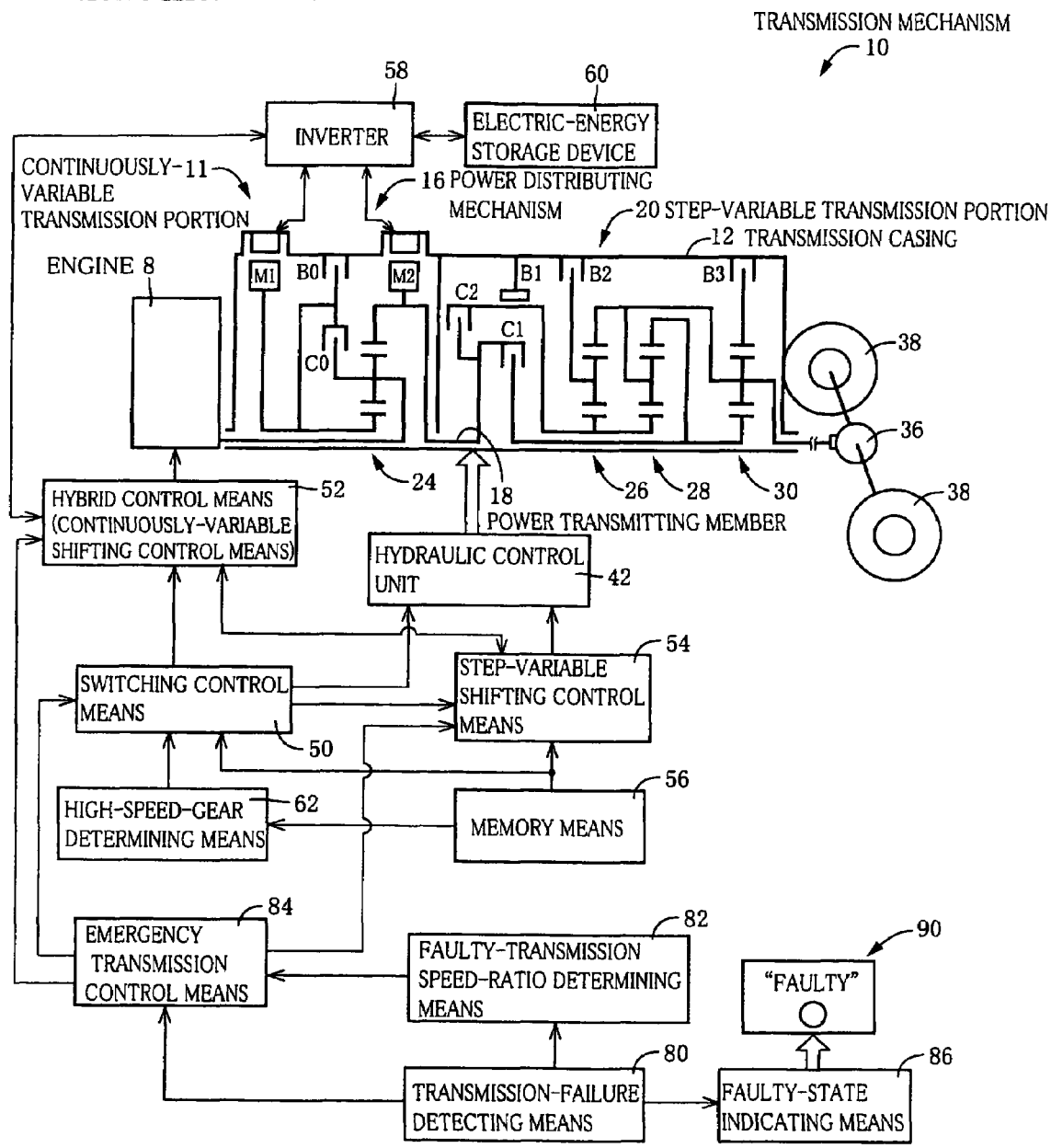
FIG. 5 is a functional block diagram illustrating major control functions of the electronic control device of FIG. 4.

Referring to the schematic view of FIG. 1, there is sown a drive mechanism 10 constituting a part of a drive system for a hybrid vehicle, which drive system is controlled by a control device according to one embodiment of this invention. As shown in FIG. 1, the transmission mechanism 10 includes an input rotary member in the form of an input shaft 14, a power transmitting device in the form of a continuously-variable transmission portion 11, a step-variable automatic transmission in the form of a step-variable transmission portion 20, and an output rotary member in the form of an output shaft 22, which are disposed on a common axis in a transmission casing 12 functioning as a stationary member attached to a body of the vehicle. The continuously-variable transmission portion 11 is connected to the input shaft 14 either directly, or indirectly via a pulsation absorbing damper (vibration damping device) not shown. The step-variable transmission portion 20 is interposed in a power transmitting path between the continuously-variable transmission portion 11 and drive wheels 38, and is connected in series to the continuously-variable transmission portion 11 via a power transmitting member 18 (power transmitting shaft). The output shaft 22 is connected to the step-variable transmission portion 20. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed-reduction device) and a pair of drive axles, as shown in FIG. 5. The differential gear device 36 constitutes a part of the other power transmitting path of the drive system. The engine 8 may be a gasoline engine or diesel engine and functions as a vehicle drive power source directly connected to the input shaft 14 or indirectly via the pulsation absorbing damper not shown. It is noted that the transmission mechanism 10 is constructed symmetrically with respect to its axis, and that the lower half of the transmission mechanism is not shown in the schematic view of FIG. 1. This is also true to the other embodiments of this invention which will be described. In the present transmission mechanism 10, the engine 8 and the continuously-variable transmission portion 11 are connected to each other directly or indirectly through the pulsation absorbing damper, as described above, but a fluid-operated power transmitting device such as a torque converter or fluid coupling is not interposed between the engine 8 and the transmission portion 11.

The continuously-variable transmission portion 11 includes: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 the output shaft of which is rotated with the power transmitting member 18. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio $\rho 1$ of about 0.418, for example, a switching clutch C0 and a switching brake B1. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the transmission casing 12, and the switching clutch C0 is disposed between the first sun gear S1 and the first carrier CA1. When the switching clutch C0 and brake B0 are both released, the power distributing mechanism 16 is placed in a differential state in which the first sun gear S1, first carrier CA1 and first ring gear R1 of the first planetary gear set 24 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in a continuously-variable shifting state (electrically established CVT state), in which the rotating speed of the power transmitting member 18 is continuously variable, irrespective of the rotating speed of the engine 8, namely, placed in the differential state in which a speed ratio $\gamma 0$ (rotating speed of the input shaft 14/rotating speed of the power transmitting member 18) of the power distributing mechanism 16 is continuously changed from a minimum value $\gamma 0min$ to a maximum value $\gamma 0max$, that is, in the continuously-variable shifting state in which the power distributing mechanism 16 functions as an electrically controlled continuously variable transmission the speed ratio $\gamma 0$ of which is continuously variable from the minimum value $\gamma 0min$ to the maximum value $\gamma 0max$.

When the switching clutch C0 or brake B0 is engaged while the power distributing mechanism 16 is placed in the continuously-variable shifting state, the mechanism 16 is brought into a non-differential state in which the differential function is not available. Described in detail, when the switching clutch C0 is engaged, the first sun gear S1 and the first carrier CA1 are connected together, so that the power distributing mechanism 16 is placed in a locked state or the non-differential state in which the three rotary elements of the first planetary gear set 24 consisting of the first sun gear S1, first carrier CA1 and first ring gear R1 are rotatable as a unit, so that the continuously-variable transmission portion 11 is also placed in the non-differential state. In this non-differential state, the rotating speed of the engine 8 and the rotating speed of the power transmitting member 18 are made equal to each other, so that the power distributing mechanism 16 is placed in a fixed-speed-ratio shifting state or step-variable shifting state in which the mechanism 16 functions as a transmission having a fixed speed ratio γ0 equal to 1. When the switching brake B0 is engaged in place of the switching clutch C0, the first sun gear S1 is fixed to the transmission casing 12, so that the power distributing mechanism 16 is placed in the locked or non-differential state in which the first sun gear S1 is not rotatable. Since the rotating speed of the first ring gear R1 is made higher than that of the first carrier CA1, the continuously-variable transmission portion 11 is placed in the fixed-speed-ratio shifting state or step-variable shifting state in which the mechanism 16 functions as a speed-increasing transmission having a fixed speed ratio γ0 smaller than 1, for example, about 0.7. Thus, the frictional coupling devices in the form of the switching clutch C0 and brake B0 function as a differential-state switching device operable to selectively place the continuously-variable transmission portion 11 (power distributing mechanism 16) selectively in the differential state and the non-differential state, that is, in the continuously-variable shifting state (differential state) in which the continuously-variable transmission portion 11 (power distributing mechanism 16) is operable as an electrically controlled continuously variable transmission, for example, as a continuously variable transmission the speed ratio of which is continuously variable, and in the locked state in which the continuously-variable transmission portion 11 is not operable as the continuously variable transmission but functions as a transmission the speed ratio of which is kept unchanged, that is, in the fixed-speed-ratio shifting state (non-differential state) in which the continuously-variable transmission portion 11 is not operable as the electrically controlled continuously variable transmission, but functions as a transmission having a single gear position with one speed ratio or a plurality of gear positions with respective to or more speed ratios, namely, in the fixed-speed-ratio shifting state in which the continuously-variable transmission portion 11 functions as a transmission having one gear position or a plurality of gear positions having fixed speed ratio or ratios.

The step-variable transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the step-variable transmission portion 20, the second sun gear S2 and the third sun gear S3 are integrally fixed to each other as a unit, selectively connected to the power transmitting member 18 through a second clutch C2, and selectively fixed to the transmission casing 12 through a first brake B1. The second carrier CA2 is selectively fixed to the transmission casing 12 through a second brake B2, and the fourth ring gear R4 is selectively fixed to the transmission casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the step-variable transmission portion 20 and the power transmitting member 18 are selectively connected to each other through the first clutch C1 or second clutch C2, which is used to establish gear positions of the step-variable transmission portion 20. In other words, the first and second clutches C1, C2 cooperate to function as coupling devices operable to switch a power transmitting path connecting the power transmitting member 18 and the step-variable transmission portion 20 (connecting the continuously-variable transmission portion 11 (power transmitting member 18) and the drive wheels 38), between a power-transmitting state in which a vehicle drive force can be transmitted through the power transmitting path, and a power-cutoff state in which the vehicle drive force cannot be transmitted through the power transmitting path. That is, the power transmitting path is placed in the power-transmitting state when at least one of the first and second clutches C1, C2 is engaged, and is placed in the power-cutoff state when the first and second clutches C1, C2 are both released.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first gear position (first speed position) through a fifth gear position (fifth speed position), a reverse gear position (rear drive position) and a neutral position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those positions have respective speed ratios γ (input shaft speed $N_{IN}$/output shaft speed $N_{OUT}$) which change as geometric series. In particular, it is noted that the power distributing mechanism 16 is provided with the switching clutch C0 and brake B0 so that the continuously-variable transmission portion 11 can be selectively placed by engagement of the switching clutch C0 or switching brake B0, in the fixed-speed-ratio shifting state in which the continuously-variable transmission portion 11 is operable as a transmission having a single gear position with one speed ratio or a plurality of gear positions with respective speed ratios, as well as in the continuously-variable shifting state in which the continuously-variable transmission portion 11 is operable as a continuously variable transmission, as described above. In the present transmission mechanism 10, therefore, a step-variable transmission is constituted by the step-variable transmission portion 20, and the continuously-variable transmission portion 11 which is placed in the fixed-speed-ratio shifting state by engagement of the switching clutch C0 or switching brake B0. Further, a continuously variable transmission is constituted by the step-variable transmission portion 20, and the continuously-variable transmission portion 11 which is placed in the continuously-variable shifting state, with none of the switching clutch C0 and brake B0 being engaged. In other words, the transmission mechanism 10 is switched to the step-variable shifting state by engaging one of the switching clutch C0 and switching brake B0, and switched to the continuously-variable shifting state by releasing both of the switching clutch C0 and brake B0. The continuously-variable transmission portion 11 is also considered to be a transmission switchable between the step-variable shifting state and the continuously-variable shifting state.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the continuously-variable transmission portion 11 functions as the continuously variable transmission, while the step-variable transmission portion 20 connected in series to the continuously-variable transmission portion 11 functions as the step-variable transmission, whereby the speed of the rotary motion transmitted to the step-variable transmission portion 20 placed in one of the first through fourth gear positions, namely, the rotating speed of the power transmitting member 18 is continuously changed, so that the speed ratio of the drive system when the step-variable transmission portion 20 is placed in one of those gear positions is continuously variable over a predetermined range. Accordingly, the speed ratio of the step-variable transmission portion 20 is continuously variable across the adjacent gear positions, whereby the overall speed ratio γT of the transmission mechanism 10 is continuously variable.

Figure 3:
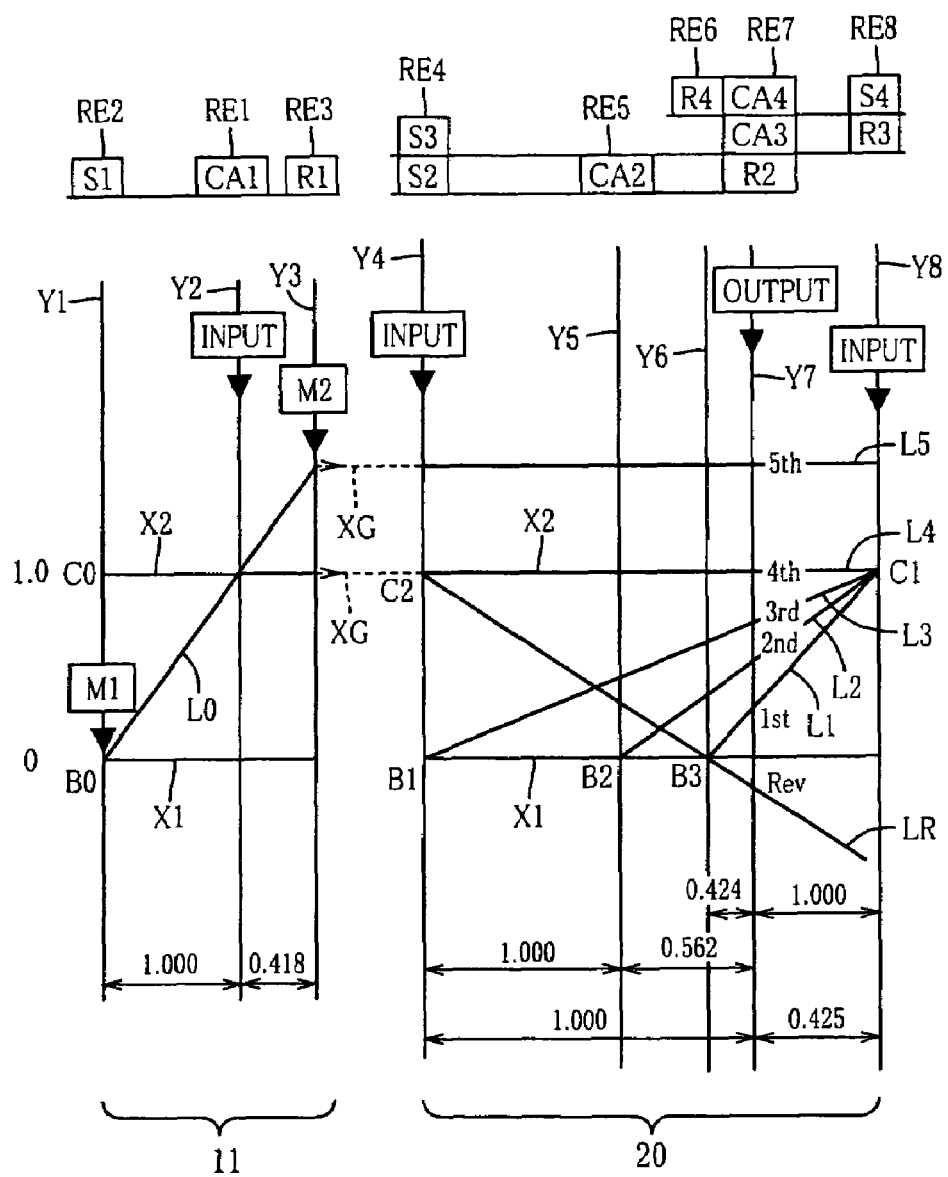
FIG. 3 is a collinear chart indicating relative rotating speeds of rotary elements of the drive system of the hybrid vehicle drive system of the embodiment of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the continuously-variable transmission portion 11 functioning as the differential portion or first transmission portion, and the step-variable transmission portion 20 functioning as the automatic transmission portion or second transmission portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 which are arranged in the right direction and which correspond to the continuously-variable transmission portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the step-variable transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines Y4-Y8 are determined by the gear ratios ρ2, ρ3 and ρ4 of the second, third and fourth planetary gear sets 26, 28, 30. That is, the distances between the sun gear and carrier of each of the second, third and fourth planetary gear sets 26, 28, 30 corresponds to "1", while the distances between the carrier and ring gear of each of those planetary gear sets 26 28, 30 corresponds to the gear ratio ρ. In the step-variable transmission portion 20, the distance between the sun gear and carrier of each of the second, third and fourth planetary gear sets 26, 28, 30 corresponds to "1", while the distance between the carrier and the ring gear corresponds to the gear ratio ρ.

Referring to the collinear chart of FIG. 3, the power distributing mechanism 16 (continuously-variable transmission portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the transmission casing 12 through the switching brake B0, while the third rotary element RE3 (first ring gear R1) is fixed to the power transmitting member 18 and the second electric motor M2, so that a rotary motion of the input shaft 14 is transmitted to the automatic transmission 20 (step-variable transmission portion) through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state by releasing actions of the switching clutch C0 and brake B0, for instance, the rotating speed of the first sun gear S1 represented by a point of intersection between the line L0 and the vertical line Y1 is raised or lowered by controlling the reaction force generated by an operation of the first electric motor M1 to generate an electric energy, so that the rotating speed of the first ring gear R1 represented by a point of intersection between the line L0 and the vertical line Y3 is lowered or raised. When the switching clutch C0 is engaged, the first sun gear S1 and the first carrier CA1 are connected to each other, and the power distributing mechanism 16 is placed in the non-differential state in which the above-indicated three rotary elements are rotated as a unit, so that the line L0 is aligned with the horizontal line X2, so that the power transmitting member 18 is rotated at a speed equal to the engine speed $N_E$. When the switching brake B0 is engaged, on the other hand, the rotation of the first sun gear S1 is stopped, and the power distributing mechanism 16 is placed in the non-differential state and functions as the speed-increasing mechanism, so that the line L0 is inclined in the state indicated in FIG. 3, whereby the rotating speed of the first ring gear R1, that is, the rotation of the power transmitting member 18 represented by a point of intersection between the lines L0 and Y3 is made higher than the engine speed $N_E$ and transmitted to the step-variable transmission portion 20.

In the step-variable transmission portion 20, the fourth rotary element RE4 is selectively connected to the power transmitting member 18 through the second clutch C2, and selectively fixed to the transmission casing 12 through the first brake B1, and the fifth rotary element RE5 is selectively fixed to the transmission casing 12 through the second brake B2, while the sixth rotary element RE6 is selectively fixed to the transmission casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the step-variable transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as shown in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the power distributing mechanism 16. When the switching clutch B0 is engaged in place of the switching clutch C0, on the other hand, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
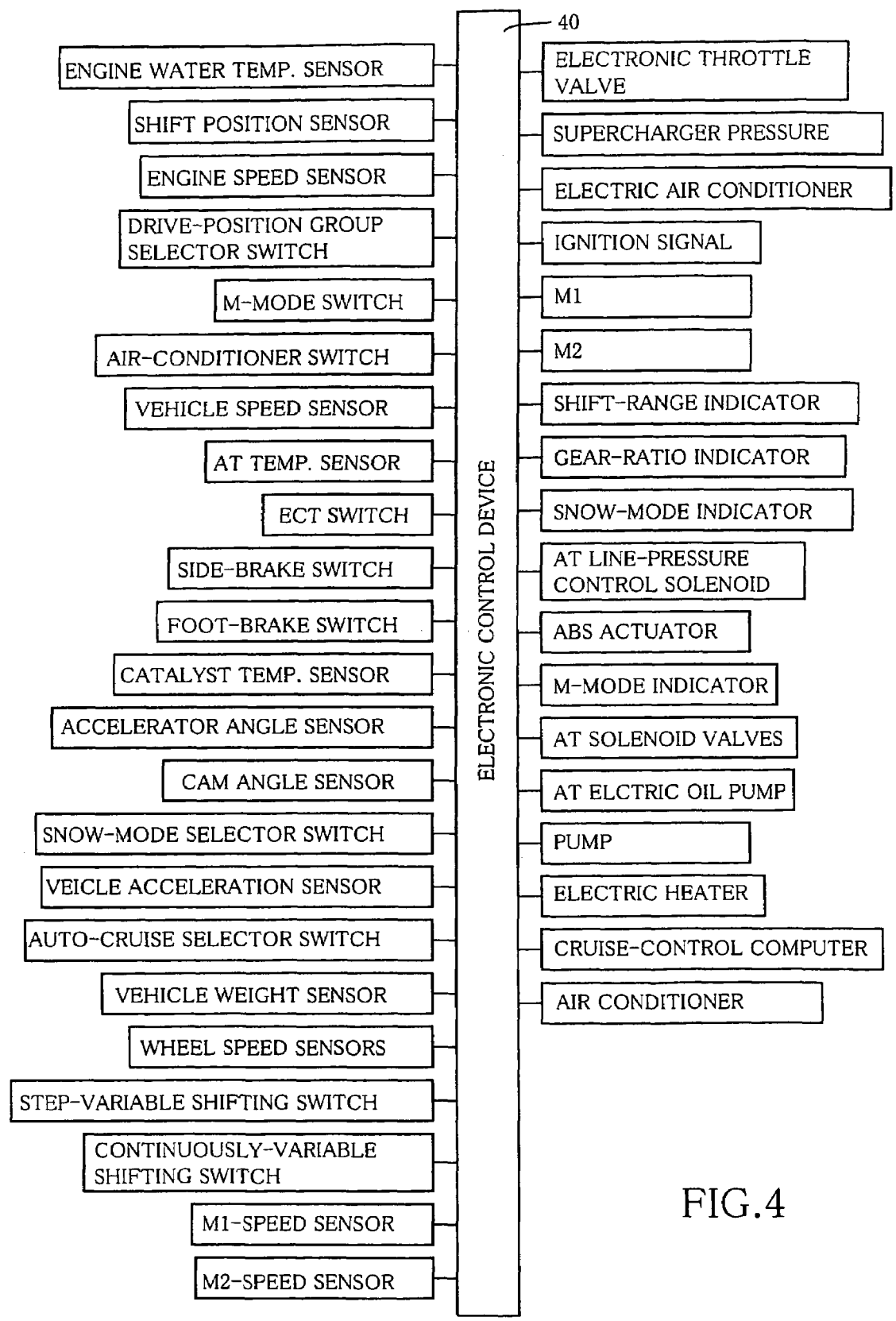
FIG. 4 is a view indicating input and output signals of an electronic control device provided in the drive system of the embodiment of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the step-variable transmission portion 20.

The electronic control device 40 is arranged to receive, from various sensors and switches shown in FIG. 4, various signals such as: a signal indicative of a temperature of cooling water of the engine; a signal indicative of a presently selected operating position $P_{SH}$ of a shift lever; a signal indicative of the operating speed $N_E$ of the engine 8; a signal indicative of a value indicating a selected group of forward-drive positions of the transmission mechanism; a signal indicative of an M mode (motor drive mode); a signal indicative of an operated state of an air conditioner; a signal indicative of a vehicle speed corresponding to the rotating speed $N_{OUT}$ of the output shaft 22; a signal indicative of the rotating speed of the power transmitting member 18 corresponding to the input speed $N_{IN}$ of the step-variable transmission portion 20; a signal indicative of a temperature of a working oil of the step-variable transmission portion 20; a signal indicative of an operated state of a side brake; a signal indicative of an operated state of a foot brake; a signal indicative of a temperature of a catalyst; a signal indicative of an operating amount $A_{CC}$ of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the continuously-variable transmission portion 11 (power distributing mechanism 16) in the fixed-speed-ratio shifting state in which the transmission mechanism 10 functions as a step-variable transmission; a signal indicative of a continuously-variable shifting switch provided to place the continuously-variable transmission portion 11 (power distributing mechanism 16) in the continuously variable-shifting state in which the transmission mechanism 10 functions as the continuously variable transmission; a signal indicative of a rotating speed $N_{M1}$ of the first electric motor M1; a signal indicative of a rotating speed $N_{M2}$ of the second electric motor M2; and a signal indicative of a magnitude of vibration of the vehicle.

The electronic control device 40 is further arranged to generate various control signals such as: a signal to drive a throttle actuator for controlling an opening angle of opening of an electronic throttle valve; a signal to control a fuel injection device for controlling an amount of injection of a fuel into the into the engine 8; a signal to control an ignition device for controlling a timing of ignition of the engine 8; a signal to adjust a pressure of a supercharger; a signal to operate the electric air conditioner; signals to operate the electric motors M1 and M2; a signal to operate a shift-range indicator for indicating the selected operating position of the shift lever; a signal to operate a gear-ratio indicator for indicating the gear ratio; a signal to operate a snow-mode indicator for indicating the selection of the snow drive mode; a signal to operate an M-mode indicator for indicating the selection of the M-mode; signals to operate solenoid-operated valves incorporated in a hydraulic control unit 42 provided to control the hydraulic actuators of the hydraulically operated frictional coupling devices of the continuously-variable transmission portion 11 and the step-variable transmission portion 20; a signal to operate an electric oil pump used as a hydraulic pressure source for the hydraulic control unit 42; a signal to drive an electric heater; and a signal to be applied to a cruise-control computer.

Reference is now made to the functional block diagram of FIG. 5 for explaining major control functions of the electronic control device 40. Step-variable shifting control means 54 shown in FIG. 5 is arranged to determine whether a shifting action of the transmission mechanism 10 should take place. This determination is made on the basis of a detected state of the vehicle in the form of the detected vehicle speed V and a detected output torque $T_{OUT}$ of the step-variable transmission portion 20, and according to a shifting boundary line map (shifting control map) which is stored in memory means 56 and is represented by solid lines and one-dot chain lines in FIG. 6. The step-variable shifting control means 54 commands the hydraulic control unit 42 to selectively engage and release the hydraulically operated frictional coupling devices except the switching clutch C0 and brake B0, for establishing the determined gear position according to the table of FIG. 2.

Hybrid control means 52 is arranged to control the engine 8 to be operated with high efficiency in the above-described continuously-variable shifting state of the transmission mechanism 10, that is, in the differential state of the continuously-variable transmission portion 11, and to optimize a proportion of drive forces generated by the engine 8 and the second electric motor M2, and a reaction force generated by the first electric motor M1 during its operation as the electric generator, for thereby controlling the speed ratio γ0 of the continuously-variable transmission portion 11 operating as the electrically controlled continuously variable transmission. For instance, the hybrid control means 52 calculates the output as required by the vehicle operator at the present running speed of the vehicle, on the basis of the operating amount $A_{CC}$ of the accelerator pedal and the vehicle running speed V, and calculate a required total vehicle output on the basis of the calculated required output and a required amount of generation of an electric energy by the electric motor. The hybrid control means 52 calculates a desired engine output, so as to obtain the calculated required total vehicle output, while taking into account of a loss of power transmission, load acting on devices optionally provided, and an assisting torque generated by the second electric motor M2. The hybrid control means 52 controls the engine 8 and the amount of generation of electric energy by the first electric motor M1, so as to establish the engine speed $N_E$ and torque $T_E$ at which the desired engine output is obtained. In other words, the hybrid control means 52 is able to control the engine speed $N_E$ for a given value of the vehicle running speed V and for a given speed ratio of the step-variable transmission portion 20, that is, for a given speed of the power transmitting member 18, by controlling the amount of generation of the electric energy by the first electric motor M1.

The hybrid control means 52 is arranged to effect the above-described hybrid control while taking account of the presently selected gear position of the step-variable transmission portion 20, so as to improve the drivability and fuel economy of the vehicle. In the hybrid control, the continuously-variable transmission portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the step-variable transmission portion 20. That is, the hybrid control means 52 determines a target value of the overall speed ratio γT of the transmission mechanism 10, so that the engine 8 is operated according to a stored highest-fuel-economy curve (fuel economy map or relationship). The target value of the overall speed ratio γT of the transmission mechanism 10 permits the engine torque $T_E$ and speed $N_E$ to be controlled so that the engine 8 provides an output necessary to drive the vehicle with the desired vehicle output. The highest-fuel-economy curve is obtained by experimentation so as to satisfy both of the requirement for improved operating efficiency and the requirement for improved fuel economy of the engine 8, and is defined in a two-dimensional coordinate system defined by an axis of the engine speed $N_E$ and an axis of the engine torque $T_E$. The hybrid control means 52 controls the speed ratio γ0 of the continuously-variable transmission portion 11, so as to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2.

It is also noted that the hybrid control means 52 is capable of establishing a so-called "motor starting and drive" mode in which the vehicle is started and driven by only the electric motor (e.g., second electric motor M2) used as the drive power source, by utilizing the electric CVT function of the continuously-variable transmission portion 11, irrespective of whether the engine 8 is in the non-operated state or in an idling state. The hybrid control means 52 is further arranged to control the reaction force of the first electric motor M1 operated as the electric generator, for thereby raising the rotating speed of the power transmitting member 18 owing to the differential function of the power distributing mechanism 16, to start the vehicle with the engine 8 used as the drive power source, when the vehicle is started with the engine 8 rather than the electric motor. Although the vehicle is usually started with the electric motor, as described above, the vehicle is started with the engine, depending upon the state of the vehicle.

The hybrid control means 52 is further capable of holding the engine 8 in an operated state owing to the electric CVT function of the continuously-variable transmission portion 11, irrespective of whether the vehicle is stationary or running at a relatively low speed. For example, the first electric motor M1 is required to be operated by the drive force of the engine 8, to generate an electric energy, when an amount of electric energy SOC stored in the electric-energy storage device 60 is reduced while the vehicle is stationary. In this case, the speed of the first electric motor M1 is raised, so that the differential function of the power distributing mechanism 16 permits the engine speed $N_E$ to be held higher than a lower limit above which the engine 8 is operable, even if the second electric motor speed $N_{M2}$ determined by the vehicle speed V is lowered to zero (substantially zero) while the vehicle is stationary.

The hybrid control means 52 is further capable of holding the engine speed $N_E$ constant at a given value or controlling the engine speed $N_E$ to a desired value, owing to the electric CVT function of the continuously-variable transmission portion 11, by controlling the operating speed $N_{M1}$ of the first electric motor M1 and/or the operating speed $N_{M2}$ of the second electric motor M2, irrespective of whether the vehicle is stationary or running. In other words, the hybrid control means 52 is capable of controlling the first electric motor speed $N_{M1}$ and/or the second electric motor speed $N_{M2}$, while holding the engine speed NE constant at a given value or controlling the engine speed $N_E$ to a desired value. To lower the second electric motor speed $N_{M2}$, for example, the hybrid control means 52 controls the second electric motor speed $N_{M2}$ so as to be lowered and controls the first electric motor speed $N_{M1}$ so as to be raised, while holding the engine speed $N_E$ constant, as is apparent from the collinear chart of FIG. 3. To lower the engine speed $N_E$ during running of the vehicle, the hybrid control means 52 controls the first electric motor speed $N_{M1}$ so as to be lowered, to thereby lower the engine speed $N_E$, since the second electric motor speed $N_{M2}$ is bound by the vehicle speed V.

The hybrid control means 52 is further capable of placing the continuously-variable transmission portion 11 in a state in which a torque cannot be transmitted therethrough, that is, in a state equivalent to a state in which the power transmitting path within the continuously-variable transmission portion 11 is disconnected. This state can be established by holding the first electric motor M1 in a free state in which the first electric motor M1 does not generate a reaction force.

Figure 6:
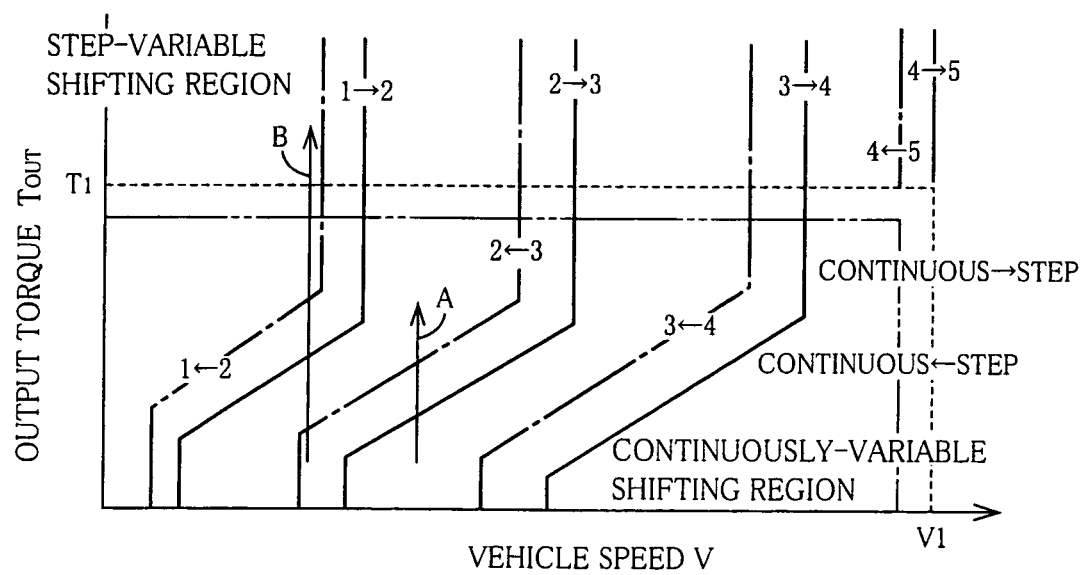
FIG. 6 is a view illustrating a stored shifting boundary line map used for determining a shifting action of an automatic transmission portion, in a two-dimensional coordinate system defined by axes of a vehicle speed and an output torque as control parameters, and a stored switching boundary line map in the same coordinate system, which is used for switching the transmission mechanism between the step-variable shifting state and the continuously-variable shifting state.

High-speed-gear determining means 62 is arranged to determine whether the gear position to which the transmission mechanism 10 should be shifted according to the shifting boundary line map of FIG. 6 stored in the memory means 56 is a high-speed-gear position, for example, the fifth gear position. This determination is made to determine which one of the switching clutch C0 and the switching brake B0 should be engaged to place the transmission mechanism 10 in the step-variable shifting state.

Switching control portion 50 is arranged to determine whether the shifting state of the transmission mechanism 10 should be changed, that is, whether the detected vehicle condition represented by the vehicle speed V and the output torque $T_{OUT}$ is in a continuously variable shifting region for placing the transmission mechanism 10 in the continuously-variable shifting state, or in a step-variable shifting region for placing the transmission mechanism 10 in the step-variable shifting state. This determination is made on the basis of the detected vehicle condition and according to a switching boundary line map (switching control map or relationship) stored in the memory means 56. An example of the switching boundary line map is indicated by broken and two-dot chain lines in FIG. 6. The switching control portion 50 selectively places the transmission mechanism 10 in the continuously-variable shifting state or step-variable shifting state, depending upon whether the present vehicle condition is in the continuously-variable shifting region or step-variable shifting region.

Described in detail, when the switching control portion 50 determines that the detected vehicle condition is in the step-variable shifting region, the switching control portion 50 disables the hybrid control means 52 to effect the hybrid control or continuously-variable shifting control, and enables the step-variable shifting control means 54 to effect a predetermined step-variable shifting control in which the step-variable transmission portion 20 is automatically shifted according to the shifting boundary line map of FIG. 6 stored in the memory means 56, for example. In this step-variable shifting control, one of the gear positions of the step-variable transmission portion 20 which is selected according to the shifting boundary line map of FIG. 6 is established by engaging the appropriate combination of the hydraulically operated frictional coupling devices C0, C1, C2, B0, B1, B2 and B3, as indicated in the table of FIG. 2, which indicates a predetermined relationship between each gear position of the transmission mechanism 10 and the corresponding combination of the frictional coupling devices. This relationship is stored in the memory means 56. Namely, the continuously-variable transmission portion 11 and the step-variable transmission portion 20 are operated as a so-called "step-variable automatic transmission" which is automatically shifted according to the predetermined relationship of FIG. 2.

When the high-speed-gear determining means 62 has determined that the transmission mechanism 10 should be shifted to the fifth gear position, for example, the switching control portion 50 commands the hydraulic control unit 42 to release the switching clutch C0 and engage the switching brake B0, for enabling the continuously-variable transmission portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control portion 50 commands the hydraulic control unit 42 to engage the switching clutch C0 and release the switching brake B0, for enabling the continuously-variable transmission portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, the transmission mechanism 10 is switched to the step-variable shifting state by the switching control means 50, and is selectively placed in one of the two gear positions while the transmission mechanism 10 is placed in the step-variable shifting state. Thus, the continuously-variable transmission portion 11 functions as the auxiliary transmission, while the step-variable transmission portion 20 connected in series to the continuously-variable transmission portion 11 functions as the step-variable transmission, so that the transmission mechanism 10 as a whole functions as the so-called "step-variable automatic transmission".

When the switching control portion 50 has determined that the detected vehicle condition is in the continuously-variable shifting region for placing the transmission mechanism 10 in the continuously-variable shifting state, the switching control portion 50 commands the hydraulic control unit 42 to release both of the switching clutch C0 and brake B0, for placing the continuously-variable transmission portion 11 in the continuously-variable shifting state, to place the transmission mechanism 10 as a whole in the continuously-variable shifting state. At the same time, the switching control portion 50 enables the hybrid control means 52 to effect the hybrid control, and commands the step-variable shifting control means 54 to select and hold a predetermined one of the gear positions, or to permit an automatic shifting control according to the shifting boundary line map stored in the memory means 56. In the latter case, the variable-step .shifting control means 54 effects the automatic shifting control by suitably selecting the combinations of the operating states of the frictional coupling devices indicated in the table of FIG. 2, except the combinations including the engagement of the switching clutch C0 and brake B0. Thus, the continuously-variable transmission portion 11 functions as the continuously variable transmission while the step-variable transmission portion 20 connected in series to the continuously-variable transmission portion 11 functions as the step-variable transmission, so that the transmission mechanism 10 provides a sufficient vehicle drive force, such that the speed of the rotary motion transmitted to the step-variable transmission portion 20 placed in one of the first through fourth gear positions, namely, the rotating speed of the power transmitting member 18 is continuously changed, so that the speed ratio of the transmission mechanism 10 when the step-variable transmission portion 20 is placed in one of those gear positions is continuously variable over a predetermined range. Accordingly, the speed ratio of the step-variable transmission portion 20 is continuously variable through the adjacent gear positions, whereby the overall speed ratio γT of the transmission mechanism 10 is continuously variable.

The maps shown in FIG. 6 will be described in detail. The shifting boundary line map (shifting control map or relationship) shown in FIG. 6 by way of example is stored in the memory means 56 and is used for determining whether the automatic transmission 20 should be shifted. The shifting boundary line map is represented in a two-dimensional coordinate system defined by axes of control parameters in the form of the vehicle speed V and the required output torque $T_{OUT}$ used as a drive-force-related value. In FIG. 6, the solid lines indicate shift-up boundary lines, while the one-dot chain lines indicate shift-down boundary lines. Further, the broken lines of FIG. 6 indicate an upper vehicle-speed limit V1 and an upper output-torque limit T1 used by the switching control means 50 to determine whether the vehicle condition is in the step-variable shifting region and the continuously-variable shifting region. Namely, the broken lines of FIG. 6 are a high-speed-running determining line that is a series of high-speed-running threshold values predetermined as the upper vehicle-speed limit V1 used for determining whether the hybrid vehicle is in a high-speed running state, and a high-output-running determining line that is a series of high-output-running threshold values predetermined as the upper output-torque limit T1, which is used as the drive-force-related value relating to the drive force of the hybrid vehicle, for example, the output torque $T_{OUT}$ of the step-variable transmission portion 20, for determining whether the hybrid vehicle is in a high-output running state. Further, two-dot chain lines in FIG. 6 indicate boundary lines offset with respect to the broken lines, by a suitable amount of control hysteresis, so that the broken lines and the two-dot chain lines are selectively used as the switching boundary lines between the step-variable shifting region and the continuously-variable shifting region. Thus, FIG. 6 shows the switching boundary line map (switching map or relationship) used by the switching control means 50 to determine whether the vehicle is in the step-variable shifting state or the continuously-variable shifting state, depending upon whether the vehicle speed V and the output torque $T_{OUT}$ are higher than the predetermined upper limit values V, T1. The shifting boundary line map and the switching boundary line map may be stored in the memory means 56, as a complex map. The switching boundary line map may include at least one of the boundary lines representative of the upper vehicle-speed limit V1 and the upper output-torque limit T1, and may use only one of the two parameters V and $T_{OUT}$.

The shifting boundary line map and the switching boundary line map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state, when the detected actual vehicle speed V has exceeded the upper limit V1, or when the detected output torque $T_{OUT}$ of the step-variable transmission portion 20 has exceeded the upper limit T1. The switching control means 50 may be arranged to place the transmission mechanism 10 in the step-variable shifting state even when the vehicle condition is in the continuously-variable shifting region, upon detection of any functional deterioration or defect of the components such as the first and second electric motors M1, M2, inverter 58 and electric-energy storage device 60 which are associated with the electric path described above and which are operable to operate the continuously-variable transmission portion 11 as the electrically controlled continuously variable transmission.

The drive-force-related value indicated above is a parameter corresponding to the drive force of the vehicle, which may be the output torque $T_{OUT}$ of the step-variable transmission portion 20, the engine torque $T_E$ or an acceleration value of the vehicle, as well as a drive torque or drive force of drive wheels 38. The engine torque $T_E$ may be an actual value calculated on the basis of the accelerator pedal operating amount or the throttle valve opening angle (or intake air quantity, air/fuel ratio or amount of fuel injection) and the engine speed $N_E$, or an estimated value of the engine torque $T_E$ or required vehicle drive force which is calculated on the basis of the amount of operation of the accelerator pedal by the vehicle operator or the throttle valve operating angle. The vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper limit V1 of the vehicle speed is determined so that the transmission mechanism 10 is placed in the step-variable shifting state while the vehicle speed V is higher than the upper limit V1. This determination is effective to minimize a possibility of deterioration of the fuel economy of the vehicle if the transmission mechanism 10 were placed in the continuously-variable shifting state at a relatively high running speed of the vehicle. The upper limit T1 of the output torque $T_{OUT}$ is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 7:
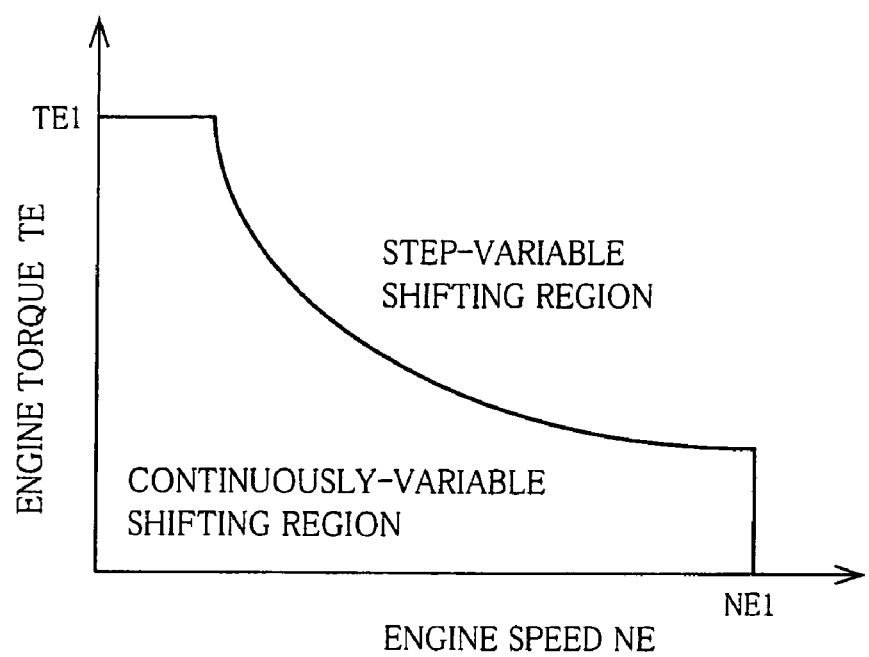
FIG. 7 is a view illustrating a shifting-region switching map indicating boundary lines defining a step-variable shifting region and a continuously-variable shifting region, the boundary lines of those shifting regions corresponding to boundary lines of the switching control map represented by broken lines in FIG. 6.

Referring to FIG. 7, there is shown a shifting-region switching map which is stored in the memory means 56 and which indicates boundary lines (switching control map or relationship) defining the step-variable shifting region and continuously-variable shifting region in a two-dimensional coordinate system which is defined by axes of control parameters in the form of the engine speed $N_E$ and the engine torque $N_T$. The boundary lines of the shifting-region switching map are considered to be engine output lines. The switching control means 50 may use the shifting-region switching map of FIG. 7 in place of the switching boundary line map of FIG. 6, to determine, on the basis of by the engine speed $N_E$ and the engine torque $T_E$, whether the detected vehicle condition represented by the engine speed $N_E$ and the engine torque $T_E$ is in the continuously-variable or step-variable shifting region. The switching boundary line map of FIG. 6 which is indicated by the broken lines in FIG. 6 is based on the map of FIG. 7. In other words, the broken lines in FIG. 6 are switching boundary lines which are represented in the two-dimensional coordinate system defined by the axes of the control parameters in the form of the vehicle speed V and the output torque $T_{OUT}$, on the basis of the relationship (map) shown in FIG. 7.

Figure 8:
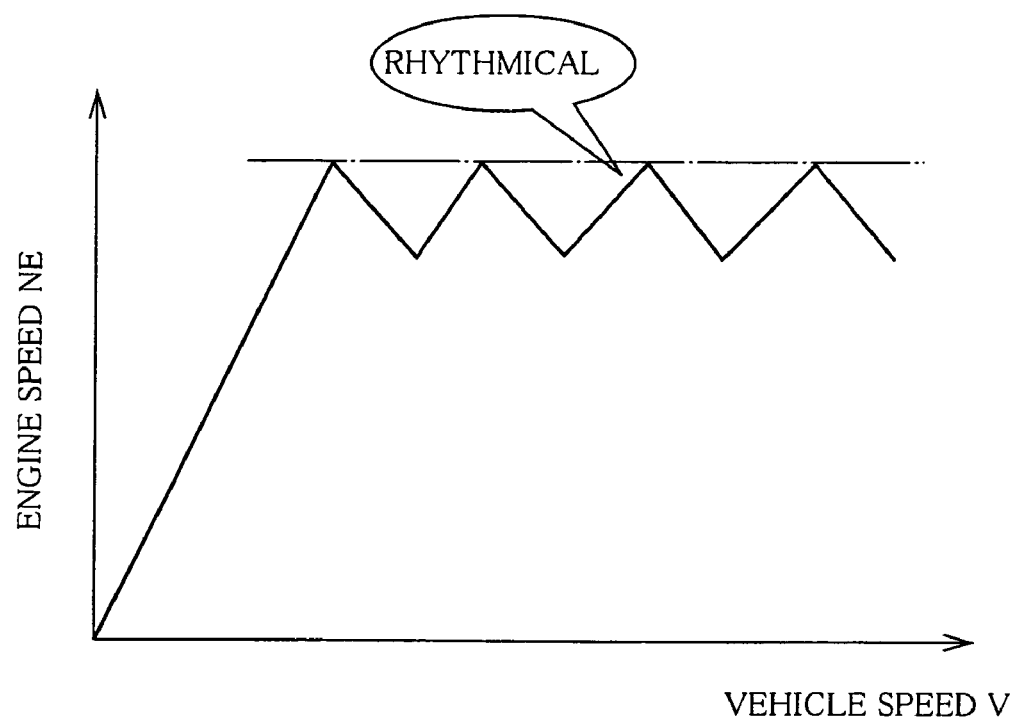
FIG. 8 is a view indicating an example of a change of the engine speed as a result of a shift-up action of the step-variable transmission.

The step-variable shifting region defined by the switching boundary line map of FIG. 6 is defined as a high-torque region in which the output torque $T_{OUT}$ is not lower than the predetermined upper limit $T_1$, or a high-speed region in which the vehicle speed V is not lower than the predetermined upper limit $V_1$. Accordingly, the step-variable shifting control is effected when the torque of the engine 8 is comparatively high or when the vehicle speed V is comparatively high, while the continuously-variable shifting control is effected when the torque of the engine 8 is comparatively low or when the vehicle speed V is comparatively low, that is, when the engine 8 is in a normal output state. Similarly, the step-variable shifting region defined by the shifting-region switching map of FIG. 7 is defined as a high-torque region in which the engine torque $T_E$ is not lower than the predetermined upper limit $T_{E1}$, or a high-speed region in which the engine speed $N_E$ is not lower than the predetermined upper limit $N_{E1}$, or alternatively defined as a high-output region in which the output of the engine 8 calculated on the basis of the engine torque $N_T$ and speed $N_E$ is not lower than a predetermined limit. Accordingly, the step-variable shifting control is effected when the torque $T_E$, speed $N_E$ or output of the engine 8 is comparatively high, while the continuously-variable shifting control is effected when the torque $T_E$, speed $N_E$ or output of the engine 8 is comparatively low, that is, when the engine 8 is in the normal output state. The boundary lines of the shifting-region switching map of FIG. 7 may be considered as high-speed threshold lines or high-engine-output threshold lines, which define upper limit of the vehicle speed V or engine output described above In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the hybrid vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the continuously-variable transmission portion 11 (power distributing mechanism 16) functions as the electrically controlled continuously variable transmission. In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors. Alternatively, in the high-output running state of the vehicle, the transmission mechanism 10 is placed in the step-variable shifting state (fixed-speed-ratio shifting state), so that the engine speed $N_E$ changes with a shift-up action of the step-variable transmission portion 20, assuring a comfortable rhythmic change of the engine speed $N_E$ as the step-variable transmission portion 20 is shifted up, as indicated in FIG. 8. Stated in the other way, when the engine is in the high-output state, it is more important to satisfy a vehicle operator's desire to improve the drivability of the vehicle, than a vehicle operator's desire to improve the fuel economy. In this respect, the transmission mechanism 10 is switched from the continuously-variable shifting state to the step-variable shifting state (fixed-speed-ratio shifting state) when the engine output becomes relatively high. Accordingly, the vehicle operator is satisfied with a comfortable rhythmic change of the engine speed $N_E$ during the high-output operation of the engine, as indicated in FIG. 8.

Referring back to FIG. 5, transmission-failure detecting means 80 is arranged to determine whether the step-variable transmission portion 20 is in an abnormal or faulty state in which the step-variable transmission portion 20 is not normally operable. For example, this determination is made on the basis of shifting command signals generated by the step-variable shifting control means 54, by checking linear solenoid valves and other control components incorporated in the hydraulic control unit 42 for controlling the hydraulic actuators of the hydraulically operated frictional coupling devices provided within the step-variable transmission portion 20, that is, by checking the hydraulic control system for engaging and releasing the hydraulically operated frictional coupling devices, to see if the hydraulic control system is in a faulty state in which the hydraulic control system is not normally operable.

The hydraulic control unit 42 is arranged to perform a so-called "fail-safe control" to establish a predetermined gear position of the step-variable transmission portion 20 for permitting the vehicle to be driven, when the step-variable transmission portion 20 fails to be normally operable. For instance, the fail-safe control is performed to establish the fourth gear position having a comparatively high speed ratio for a relatively low output speed, or the second gear position having a comparatively low speed ratio for a relatively high output speed. In other words, the fail-safe control is performed such that the total speed ratio (overall speed ratio) $\gamma T$ of the transmission mechanism 10 determined by the speed ratio $\gamma 0$ of the continuously-variable transmission portion 11 and the speed ratio $\gamma$ of the step-variable transmission portion 20 is comparatively low or high.

According to the fail-safe control, the gear position for the relatively high output speed is established for preventing or reducing an engine braking effect during a high-speed running of the vehicle, for example, while the gear position for the relatively low output speed is established for permitting starting of the vehicle on a sand roadway (desert roadway) or any other roadway having a bad surface condition, for example.

If the step-variable transmission portion 20 fails to be normally operable during a low-speed or uphill running of the vehicle with a comparatively high value of the overall speed ratio $\gamma T$, for example, the step-variable transmission portion 20 is shifted to a gear position for a relatively high output speed, so that the vehicle may not be run with a sufficient drive force. If the step-variable transmission portion 20 fails to be normally operable during a high-speed running of the vehicle with a comparatively low value of the overall speed ratio $\gamma T$, on the other hand, the step-variable transmission portion 20 is shifted to a gear position for a relatively low output speed, so that the vehicle may be run with an excessively large drive force or an excessively large engine braking effect.

In view of the drawback indicated above, faulty-transmission speed-ratio determining means 82 is provided to determine the actually established gear position of the step-variable transmission portion 20 when the faulty state of the step-variable transmission portion 20 has been detected by the transmission-failure detecting means 80. For example, the faulty-transmission speed-ratio determining means 82 is arranged to calculate the speed ratio $\gamma$ ($=N_{IN}/N_{OUT}$) of the step-variable transmission portion 20 in the faulty state, on the basis of the output speed $N_{OUT}$ of the output shaft 22 and the input speed $N_{IN}$ of the step-variable transmission portion 20, which are received by the electronic control device 40. On the basis of the calculated speed ratio $\gamma$, the faulty-transmission speed-ratio determining means 82 determines whether the gear position for the relatively high output speed is actually established or not. Alternatively, the faulty-transmission speed-ratio determining means 82 may be arranged to determine whether the gear position for the relatively low output speed is actually established.

Emergency transmission control means 84 is provided to command the hybrid control means 52 to change the speed ratio $\gamma 0$ of the continuously-variable transmission portion 11, when the transmission-failure detecting means 80 has detected the faulty state of the step-variable transmission portion 20. Described in detail, the emergency transmission control means 84 is arranged to command the hybrid control means 52 to increase the speed ratio $\gamma 0$ of the continuously-variable transmission portion 11 when the faulty-transmission speed-ratio determining means 82 has determined that the gear position for the relatively high output speed is established in the step-variable transmission portion 20 the faulty state of which has been detected by the transmission-failure detecting means 90. Accordingly, a change of the overall speed ratio $\gamma T$ of the transmission mechanism 10 to a value for a relatively high output speed is reduced, so that the vehicle can be run with a sufficient drive force.

When the faulty-transmission speed-ratio determining means 82 has determined that the gear position for the relatively low output speed is established in the step-variable transmission portion 20 the faulty state of which has been detected by the transmission-failure detecting means 90, the emergency transmission control means 84 is arranged to command the hybrid control means 52 to reduce the speed ratio $\gamma 0$ of the continuously-variable transmission portion 11. Accordingly, a change of the overall speed ratio $\gamma T$ of the transmission mechanism 10 to a value for a relatively low output speed is reduced to reduce an amount of increase of the vehicle drive force or the engine braking effect.

Namely, the emergency transmission control means 84 commands the hybrid control means 52 to increase or reduce the speed ratio $\gamma 0$ by such a ratio as to change the actual overall speed ratio $\gamma T$ of the transmission mechanism 10 to a value as close as possible to the value immediately before the step-variable transmission portion 20 fails to be normally operable.

According to the command from the emergency transmission control means 84, the hybrid control means 52 controls the ratio of increase or reduction of the speed ratio $\gamma 0$, by changing the first electric motor speed $N_{M1}$. Thus, the emergency transmission control means 84 commands the hybrid control means 52 to change the speed ratio $\gamma 0$ of the continuously-variable transmission portion 11 such that the overall speed ratio $\gamma T$ of the transmission mechanism 10 approaches the value immediately before the step-variable transmission portion 20 fails to be normally operable. For example, the hybrid control means 52 determines the overall speed ratio $\gamma T$ immediately before detection of the faulty state of the step-variable transmission portion 20, on the basis of the actual value of the overall speed ratio $\gamma T$ which is stored in a memory device (not shown) and updated from time to time until the step-variable transmission portion 20 fails to be normally operable.

Where it is determined that the gear position for the relatively low output speed is established in the step-variable transmission portion 20 the faulty state of which has been detected by the transmission-failure determining means 82, the emergency transmission control means 84 may command the hybrid control means 52 to temporarily place the continuously-variable transmission portion 11 in its neutral state, to prevent an excessive increase of the vehicle drive force or an excessive engine braking effect, rather than to reduce the speed ratio $\gamma 0$ of the continuously-variable transmission portion 11 as described above. In this case, the hybrid control means 52 switches the first electric motor M1 from its electricity generating state to its free state. The first electric motor M1 placed in the free state does not generate a reaction torque due to generation of an electric energy, and is not able to transmit the engine torque $T_E$, while at the same time the second electric motor M2 is switched from its state of power transmission through the electric path to its free state, so that the continuously-variable transmission portion 11 is placed in the neutral state in which the path of power transmission through the continuously-variable transmission portion 11 is cut off.

Figure 9:
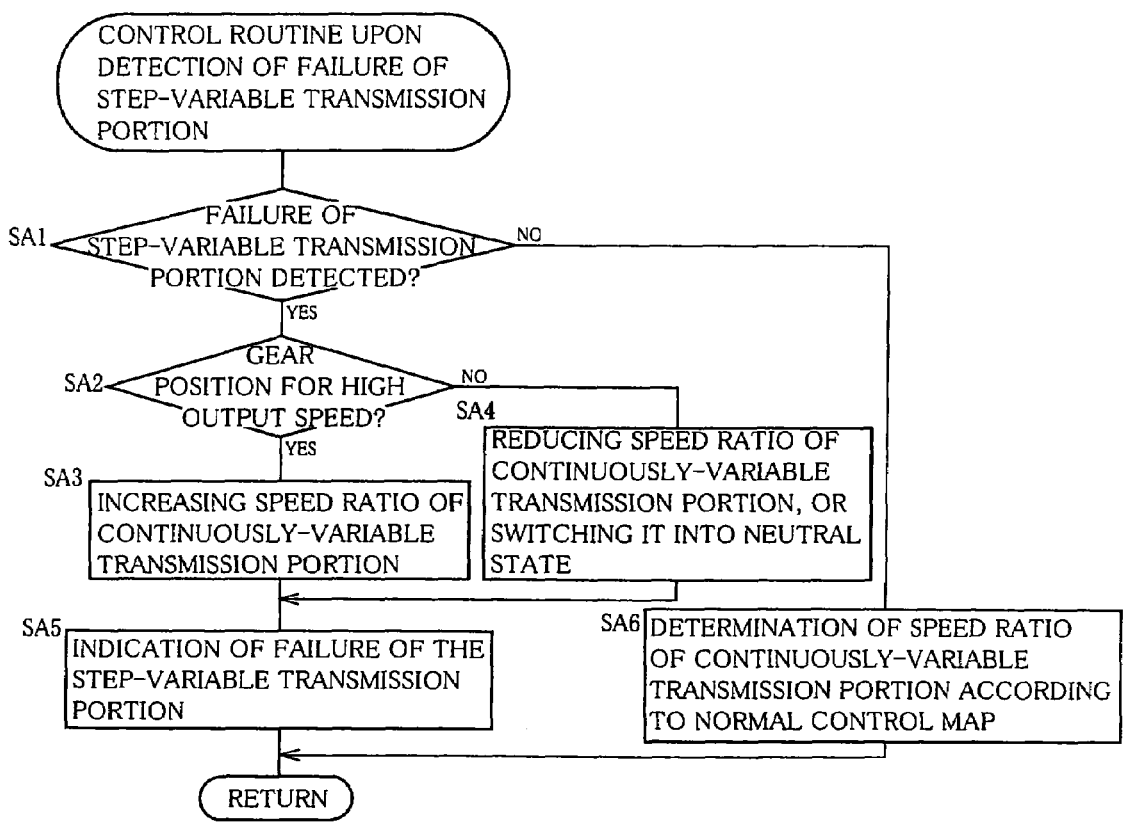
FIG. 9 is a flow chart illustrating a control routine executed by the electronic control device of FIG. 5 for permitting running of the vehicle upon detection of a failure of the step-variable transmission portion.
Figure 10:
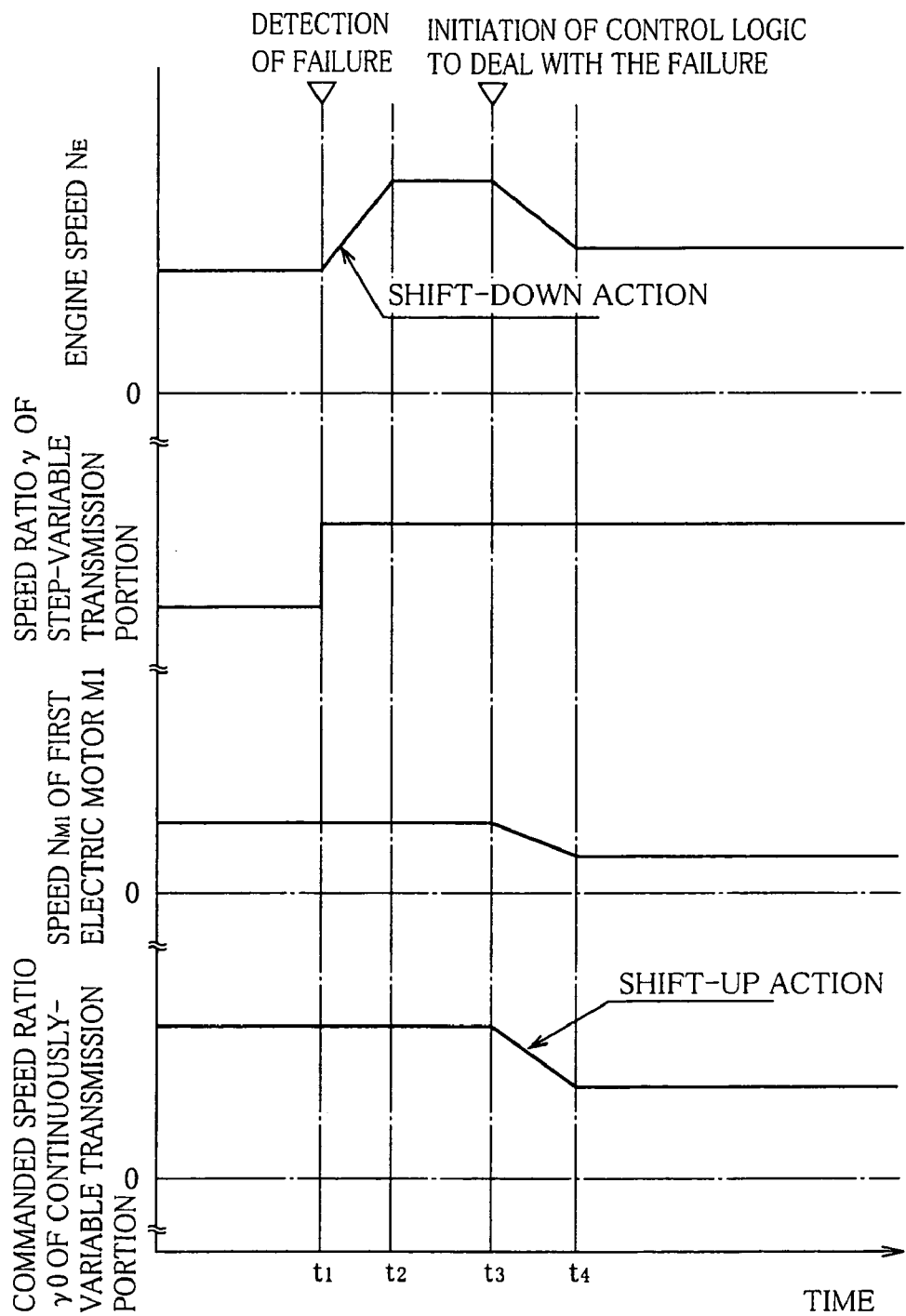
FIG. 10 is a time chart for explaining the control routine illustrated in the flow chart of FIG. 9, that is, a control operation to reduce the speed ratio of a continuously-variable transmission portion, upon detection of a faulty state of the step-variable transmission portion, which causes a shift-down action of the step-variable transmission potion to a gear position for a relatively lower output speed.
Figure 11:
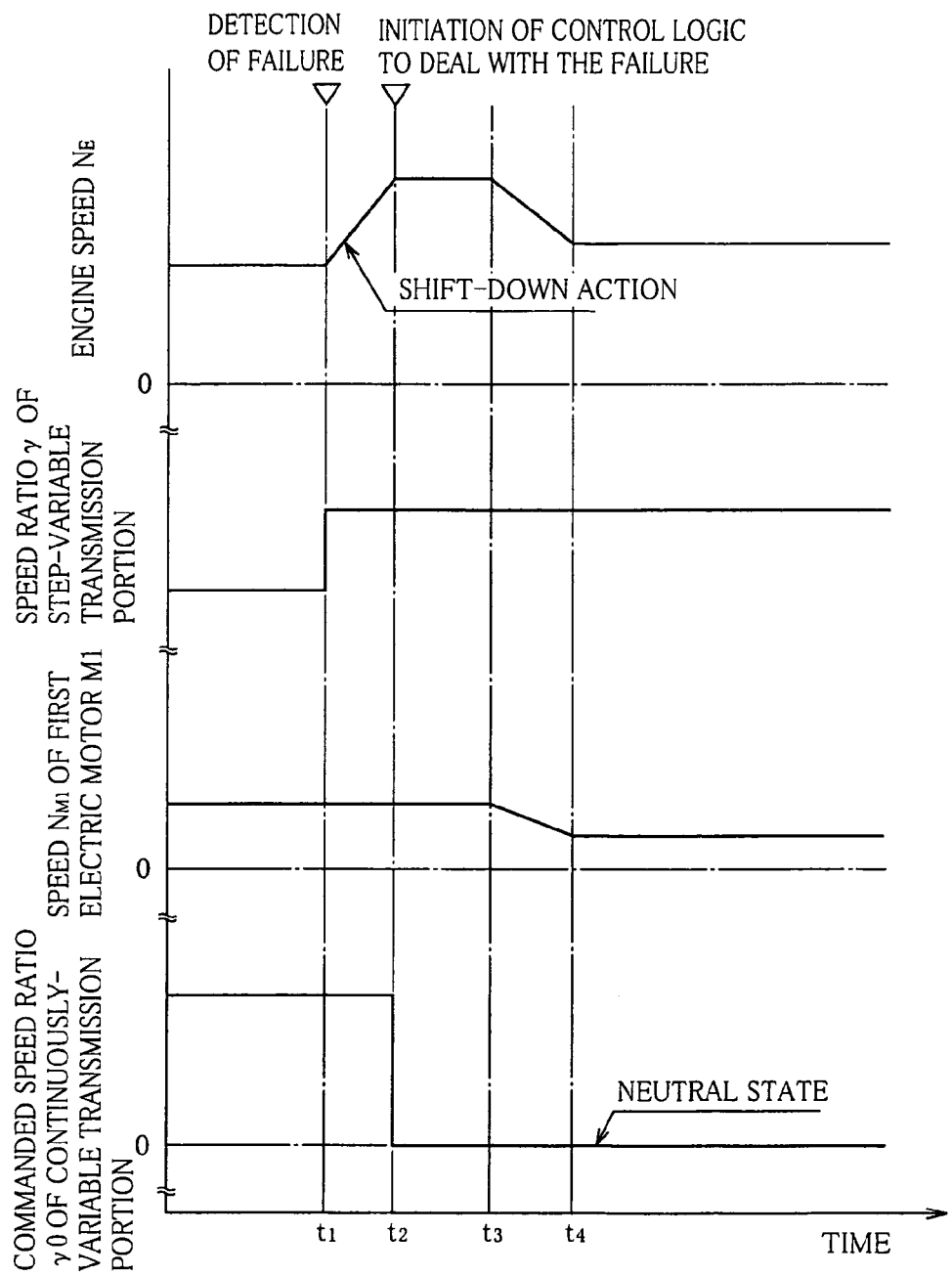
FIG. 11 is a time chart for explaining the control routine illustrated in the flow chart of FIG. 9, that is, a control operation to place the continuously-variable transmission portion in its neutral state, upon detection of the faulty state of the step-variable transmission portion, which causes a shift-down action of the step-variable transmission portion to the gear position for the relatively low output speed.

Faulty-state indicating means 86 is operated upon detection of the faulty state of the step-variable transmission portion 20 by the transmission-failure detecting means 80, to activate a faulty-state indicator device 90 for indicating that the step-variable transmission portion 20 is presently in the faulty state. For instance, the faulty-state indicator device 90 is arranged to illuminate an encircled portion of its display (as indicated in FIG. 5), for thereby informing the user of the faulty state of the step-variable transmission portion 20, Referring to the flow chart of FIG. 9, there is illustrated a major control operation of the electronic control device 40, that is, a control routine to assure high drivability of the vehicle when the step-variable transmission portion 20 (indicated as "step-variable transmission portion" in FIG. 9) is in the faulty state. This control routine is repeatedly executed with an extremely short cycle time form about several milliseconds to about several tens of milliseconds. FIG. 10 is a time chart for explaining an example of the control routine illustrated in the flow chart of FIG. 9, that is, a control operation to reduce the speed ratio γ0 of the continuously-variable transmission portion 11 (indicated as "continuously-variable transmission portion" in FIG. 9), upon detection of the faulty state of the step-variable transmission portion 20, which causes a shift-down action of the step-variable transmission portion 20 to the gear position for a relatively low output speed, while FIG. 11 is a time chart for explaining another example of the control routine illustrated in the flow chart of FIG. 9, that is, a control operation to place the continuously-variable transmission portion 11 in its neutral state, upon detection of the faulty state of the step-variable transmission portion 20, which causes a shift-down action of the step-variable transmission portion 20 to the gear position for the relatively low output speed.

The control routine is initiated with step SA1 ("step" being hereinafter omitted) corresponding to the transmission-failure detecting means 80, to determine whether the step-variable transmission portion 20 is in the faulty state. For example, this determination is made on the basis of the shifting command signals generated by the step-variable shifting control means 54, by checking the linear solenoid valves and other control components incorporated in the hydraulic control unit 42 for controlling the hydraulic actuators of the hydraulically operated frictional coupling devices provided within the step-variable transmission portion 20, that is, by checking the hydraulic control system for engaging and releasing the hydraulically operated frictional coupling devices, to see if the hydraulic control system is in a faulty state in which the hydraulic control system is not normally operable. In the examples of FIGS. 10 and 11, the faulty state of the step-variable transmission portion 20 is detected at a point of time t1.

If a negative decision is obtained in SA1, the control flow goes to SA6 to perform normal control operations other than the control operation to be performed to assure high drivability of the vehicle upon detection of the step-variable transmission portion 20, for example, control operations to shift the step-variable transmission portion 20 or maintain its present gear position under the control of the step-variable shifting control means 54 according to the shifting boundary line map shown FIG. 6. One cycle of execution of the present control routine is terminated with SA6.

If an affirmative decision is obtained in SA1, the control flow goes to SA2 corresponding to the faulty-transmission speed-ratio determining means 82, to determine the actually established gear position of the step-variable transmission portion 20 the faulty state of which has been detected. For example, the faulty-transmission speed-ratio determining means 82 is arranged to calculate the speed ratio γ (=$N_{IN}$/$N_{OUT}$) of the step-variable transmission portion 20 in the faulty state, on the basis of the output speed $N_{OUT}$ of the output shaft 22 and the input speed $N_{IN}$ of the step-variable transmission portion 20, On the basis of the calculated speed ratio γ, the faulty-transmission speed-ratio determining means 82 determines whether the gear position for the relatively high output speed is actually established or not.

If an affirmative decision is obtained in SA2, the control flow goes to SA3 corresponding to the emergency transmission control means 84, to command the hybrid control means 52 to increase the speed ratio γ0 of the continuously-variable transmission portion 11, for thereby assuring running of the vehicle with a sufficient drive force. For example, the hybrid control means 52 is commanded to increase the speed ratio γ0 by such a ratio as to change the actual overall speed ratio γT of the transmission mechanism 10 to a value as close as possible to the value immediately before the step-variable transmission portion 20 fails to be normally operable. According to the command from the emergency transmission control means 84, the hybrid control means 52 changes the first electric motor speed $N_{M1}$ for thereby controlling the ratio of increase of the speed ratio γ0.

If a negative decision is obtained in SA2, the control flow goes to SA4 corresponding to the emergency transmission control means 84, to command the hybrid control means 54 to reduce the speed ratio γ0 of the continuously-variable transmission portion 11, for thereby reducing an amount of increase of the vehicle drive force or the engine braking effect. For example, the hybrid control means 52 is commanded to reduce the speed ratio γ0 by such a ratio as to change the actual overall speed ratio γT of the transmission mechanism 10 to a value as close as possible to the value immediately before the step-variable transmission portion 20 fails to be normally operable. According to the command from the emergency transmission control means 84, the hybrid control means 52 changes the first electric motor speed $N_{M1}$ for thereby controlling the ratio of increase of the speed ratio γ0. In the example of FIG. 10, the hybrid control means 52 is commanded to reduce the first electric motor speed $N_{M1}$ for thereby reducing the speed ratio 0 of the continuously-variable transmission portion 11, during a time period from a point of time t3 to a point of time t4.

In the example of FIG. 10, the engine speed $N_E$ is raised during a time period from the point of time t1 to a point of time t2, as a result of a shift-down action of the step-variable transmission portion 20 to the gear position for the relatively low output speed, which shift-down action takes place when the step-variable transmission portion 20 fails to be normally operable. During the time period from the point of time t3 to the point of time t4, the first electric motor speed $N_{M1}$ is reduced to reduce the speed ratio γ0, as a result of the determination that the gear position for the relatively low output speed is established in the faulty step-variable transmission portion 20, so that the actual overall speed ratio γT of the transmission portion 10 changes to the value immediately before the point of time t1 of FIG. 10 at which the step-variable transmission portion 20 fails to be normally operable. Accordingly, the engine speed $N_E$ after the point of time t4 is made closer to the engine speed $N_E$ during the time period before the point of time t1, than the engine speed $N_E$ during the time period from the point of time t2 to the point of time t3.

The hybrid control means 52 may be commanded, in the step SA4, to temporarily place the continuously-variable transmission portion 11 in its neutral state, for preventing an increase of the vehicle drive force or generation of an engine braking effect, in place of reducing the speed ratio γ0 of the continuously-variable transmission portion 11. In the example of FIG. 11, the continuously-variable transmission portion 11 is held in the neutral state under the control of the hybrid control means 52, during a time period after the point of time t2.

In the example of FIG. 11, the engine speed $N_E$ is raised during a time period from the point of time t1 to a point of time t2, as a result of a shift-down action of the step-variable transmission portion 20 to the gear position for the relatively low output speed, which shift-down action takes place when the step-variable transmission portion 20 fails to be normally operable. At the point of time t2 following the determination that the gear position for the relatively low output speed is established in the step-variable transmission portion 20 in the faulty state, the first electric motor M1 is switched from the electricity generating state to the free state, under the control of the hybrid control means 52, so that the continuously-variable transmission portion 11 is placed in the neutral state in which the path of power transmission through the continuously-variable transmission portion 11 is cut off. After the point of time t2 in FIG. 11 at which the continuously-variable transmission portion 11 is switched into the neutral state, the engine 8 is held in a non-load state, and the engine speed $N_E$ is freely changeable, while the first electric motor M1 is held in the free state, so that the first electric motor speed $N_{M1}$ follows the engine speed $N_E$. The continuously-variable transmission portion 11 is held in the neutral state only temporarily, (although this temporal neutralization is not indicated in FIG. 11), so as to permit the vehicle to be driven again. For instance, the continuously-variable transmission portion 11 is switched from the neutral state back to the original operating state when the vehicle speed V has been lowered to a value at which the engine braking effect is relatively small.

The above-described steps SA3 and SA4 are followed by SA5 corresponding to the faulty-state indicating means 86, to activate the faulty-state indicator device 90 to indicate that the step-variable transmission portion 20 is in the faulty state.

In the present embodiment wherein the transmission mechanism 10 includes the continuously-variable transmission portion 11 and the step-variable transmission portion 20, the emergency transmission control means 84 is operated when the step-variable transmission portion 20 fails to be normally operable, so that the speed ratio γ0 of the continuously-variable transmission portions 11 is changed by the emergency transmission control means 84. Accordingly, the emergency transmission control means 84 reduces a change of the overall speed ratio γT of the transmission mechanism 10 determined by the speed ratio γ0 of the continuously-variable transmission portion 11 and the speed ratio γ of the step-variable transmission portion 20, thereby assuring high drivability of the vehicle.

The emergency transmission control means 84 in the present embodiment is further arranged to increase the speed ratio γ0 of the continuously-variable transmission portion 11 if the speed ratio of the step-variable transmission portion 20 has changed to a value for a relatively high output speed due to a failure of the step-variable transmission portion 20. Accordingly, an amount of change of the overall speed ratio γT of the transmission mechanism 10 to a value for a relatively high output speed is reduced, so that the vehicle can be run with a sufficient drive force. For example, the emergency transmission control means 84 increases the speed ratio γ0 of the continuously-variable transmission portion 11 for thereby changing the overall speed ratio γT to a value immediately before detection of the faulty state of the step-variable transmission portion 20, making it possible to reduce an amount of reduction of the vehicle drive torque due to the change of the speed ratio of the step-variable transmission portion 20 to the value for the relatively high output speed, so that the vehicle can be run with high drivability.

The emergency transmission control means 84 in the present embodiment is further arranged to reduce the speed ratio γ0 of the continuously-variable transmission portion 11 if the speed ratio of the step-variable transmission portion 20 has changed to a value for a relatively low output speed due to the failure of the step-variable transmission portion 20. Accordingly, an amount of change of the overall speed ratio γT of the transmission mechanism 10 to a value for a relatively low output speed is reduced, so that an amount of increase of the vehicle drive force or the engine braking effect can be reduced. For example, the emergency transmission control means 84 reduces the speed ratio γ0 of the continuously-variable transmission portion 11 for thereby changing the overall speed ratio γT to a value immediately before detection of the faulty state of the step-variable transmission portion 20, making it possible to reduce the engine braking effect due to the change of the speed ratio of the step-variable transmission portion 20 to the value for the relatively low output speed, so that the vehicle can be run with high drivability (high stability).

In the present embodiment wherein the transmission mechanism 10 includes the continuously-variable transmission portion 11 and the step-variable transmission portion 20, the emergency transmission control means 84 is operated upon detection of the faulty state of the step-variable transmission portion 20, to place the continuously-variable transmission portion 11 in its neutral state in which the path of power transmission through the continuously-variable transmission portion 11 is cut off. Thus, the emergency transmission control means 84 is effective to prevent generation of an engine braking effect due to the change of the speed ratio of the step-variable transmission portion 20 in the faulty state.

There will be described other embodiments of this invention. In the following description, the same reference signs as used in the preceding embodiment will be used to identify the common elements, which will not be described.

Embodiment 2

Referring back to FIG. 5, the transmission-failure detecting means 80 performs, in addition to or in place of the function performed in the preceding embodiment, a function of determining whether the continuously-variable transmission portion 11 is in an abnormal or faulty state in which the continuously-variable transmission portion 1 is not normally operable. For example, this determination is made by determining whether at least one of the first electric motor M1 and the second electric motor M2 is not normally operable. The faulty state in which the first or second electric motor M1, M2 is not normally operable include a state in which the first or second electric motor M1, M2 per se is normally operable but in which the first electric motor speed $N_{M1}$ or second electric motor speed $N_{M2}$ is not controllable by the hybrid control means 52 to control the continuously-variable transmission portion 11 as the electrically controlled continuously variable transmission, due to a failure or functional deterioration of the first electric motor speed sensor or the second electric motor speed sensor (not shown). The faulty state in which the first or second electric motor Ml, M2 is not normally operable also includes a state in which the first or second electric motor Ml, M2 is not normally operable under the control of the hybrid control means 52 to control the continuously-variable transmission portion 11 as the electrically controlled continuously variable transmission, due to a failure or functional deterioration of the first or second electric motor Ml, M2 per se, and a failure or functional deterioration of any components associated with the electric path, such as a failure or functional deterioration due to low operating temperature, of the inverter 58, electric-energy storage device 60, and electrical conductors connecting those components.

Thus, the transmission-failure detecting means 80 is operated on the basis of the states of detection of the first electric motor speed $N_{M1}$ and second electric motor speed $N_{M2}$, the states of energization of the first electric motor Ml and second electric motor M2, and the first electric motor speed NM1 and second electric motor speed NM2, to determine whether the first electric motor speed sensor or the second electric motor speed sensor 34 suffers from a failure or functional deterioration, whether the first or second electric motor M1, M2 suffers from a failure or functional deterioration, and whether any component associated with the electric path suffers from a failure or functional deterioration, for thereby determining whether the continuously-variable transmission portion 11 is in the faulty state in which at least one of the first and second electric motors M1, M2 is not normally operable. In this respect, the transmission-failure detecting means 80 is considered to function as electric-motor-failure detecting means for detecting the failure or functional deterioration of the first electric motor speed sensor or second electric motor speed sensor, the failure or functional deterioration of the first electric motor M1 or second electric motor M2, and the failure or functional deterioration of the components associated with the electric path.

The determination by the transmission-failure detecting means 80 as to whether the continuously-variable transmission portion 11 is in the faulty state may be made on the basis of shifting command signals generated by the switching control means 50, in place of or in addition to the above-described determination of the faulty state in which at least one of the first and second electric motors M1, M2 is not normally operable. Namely, the determination may be made by checking high-flow linear solenoid valves and other control components incorporated in the hydraulic control unit 42 for controlling the hydraulic actuators of the switching clutch C0 and brake B0 for switching of the shifting state of the continuously-variable transmission portion 11, that is, by checking the hydraulic control system for engaging and releasing the switching clutch C0 and brake B0, to see if the hydraulic control system is a faulty state in which the hydraulic system is not normally operable.

If the continuously-variable transmission portion 11 fails to be normally operable, the hybrid control means 52 cannot control the speed ratio γ0 of the continuously-variable transmission portion 11 and the overall speed ratio γT of the transmission mechanism 10, so that there is a possibility that the vehicle cannot be run with high drivability. If the continuously-variable transmission portion 11 fails to be normally operable during a low-speed or uphill running of the vehicle with a comparatively high value of the overall speed ratio γT, for example, the speed ratio of the continuously-variable transmission portion 11 is changed to a value for a relatively high output speed, so that the vehicle may not be run with a sufficient drive force. If the continuously-variable transmission portion 11 fails to be normally operable during a high-speed running of the vehicle with a comparatively low value of the overall speed ratio γT, on the other hand, the speed ratio of the continuously-variable transmission portion 11 is changed to a value for a relatively low output speed, so that the vehicle may be run with an excessively large drive force or an excessively large engine braking effect.

In view of the drawback indicated above, the faulty-transmission speed-ratio determining means 82 performs, in addition to or in place of the function performed in the preceding embodiment, a function of determining the actually established speed ratio γ0 of the continuously-variable transmission portion 11 when the faulty state of the continuously-variable transmission portion 11 has been detected by the transmission-failure detecting means 80.

For example, the faulty-transmission speed-ratio determining means 82 is arranged to calculate the actually established speed ratio γ0 ($=N_E/N_{IN}$) of the continuously-variable transmission portion 11 in the faulty state, on the basis of the output speed of the continuously-variable transmission 11, namely, the input speed $N_{IN}$ of the step-variable transmission portion 20, and the input speed of the continuously-variable transmission 11, namely, the engine speed NE, which are received by the electronic control device 40. If the actually established speed ratio γ0 is lower than the value γ0 immediately before the continuously-variable transmission portion 11 fails to be normally operable, the faulty-transmission speed-ratio determining means 82 determines that the actually established speed ratio γ0 is a speed ratio for a relatively high output speed. If the actually established speed ratio γ0 is higher than the value γ0 immediately before the continuously-variable transmission portion 11 fails to be normally operable, on the other hand, the faulty-transmission speed-ratio determining means 82 determines that the actually established speed ratio γ0 is a speed ratio for a relatively low output speed. The faulty-transmission speed-ratio determining means 82 is arranged to determine the speed ratio γ0 immediately before detection of the faulty state of the continuously-variable transmission portion 11, on the basis of the actual value of the speed ratio γ0 which is stored in a memory device (not shown) and updated from time to time until the continuously-variable transmission portion 11 fails to be normally operable.

Emergency transmission control means 84 performs, in addition to or in place of the function performed in the preceding embodiment, a function of commanding the step-variable shifting control means 54 to change the speed ratio γ of the step-variable transmission portion 20, when the transmission-failure detecting means 80 has detected the faulty state of the continuously-variable transmission portion 11. Described in detail, the emergency transmission control means 84 is arranged to command the step-variable shifting control means 54 to increase the speed ratio γ of the step-variable transmission portion 20 when the faulty-transmission speed-ratio determining means 82 has determined that the gear position for the relatively high output speed is established in the continuously-variable transmission portion 11 the faulty state of which has been detected by the transmission-failure detecting means 90. Accordingly, a change of the overall speed ratio γT of the transmission mechanism 10 to a value for a relatively high output speed is reduced, so that the vehicle can be run with a sufficient drive force.

When the faulty-transmission speed-ratio determining means 82 has determined that the gear position for the relatively low output speed is established in the continuously-variable transmission portion 11 the faulty state of which has been detected by the transmission-failure detecting means 90, the emergency transmission control means 84 is arranged to command the step-variable shifting control means 54 to reduce the speed ratio γ of the step-variable transmission portion 20. Accordingly, a change of the overall speed ratio γT of the transmission mechanism 10 to a value for a relatively low output speed is reduced to reduce an amount of increase of the vehicle drive force or the engine braking effect.

Namely, the emergency transmission control means 84 commands the step-variable shifting control means 54 to increase or reduce the speed ratio γ of the step-variable transmission portion 20 by such a ratio as to change the actual overall speed ratio γT of the transmission mechanism 10 to a value as close as possible to the value immediately before the continuously-variable transmission portion 11 fails to be normally operable.

According to the command from the emergency transmission control means 84, the step-variable shifting control means 54 controls the ratio of increase or reduction of the speed ratio γ of the step-variable transmission portion 20. Thus, the emergency transmission control means 84 commands the step-variable shifting control means 54 to change the speed ratio γ (gear position) of the step-variable transmission portion 20 such that the overall speed ratio γT of the transmission mechanism 10 approaches the value immediately before the continuously-variable transmission portion 11 fails to be normally operable. The step-variable shifting control means 54 determines the overall speed ratio γT immediately before detection of the faulty state of the continuously-variable transmission portion 11, on the basis of the actual value of the overall speed ratio γT which is stored in a memory device (not shown) and updated from time to time until the continuously-variable transmission portion 11 fails to be normally operable.

Where it is determined that the gear position for the relatively low output speed is established in the continuously-variable transmission portion 11 the faulty state of which has been detected by the transmission-failure determining means 82, the emergency transmission control means 84 may command the step-variable shifting control means 54 to temporarily place the step-variable transmission portion 20 in its neutral state, to prevent an excessive increase of the vehicle drive force or an excessive engine braking effect, rather than to reduce the speed ratio γ of the step-variable transmission portion 20 as described above. In this case, the step-variable shifting control means 55 commands the hydraulic control unit 42 to release both of the first clutch C1 and the second clutch C2, for establishing the neutral position "N" as indicated in the table of FIG. 2, so that the step-variable transmission portion 20 is placed in the neutral state in which the path of power transmission through the step-variable transmission portion 20 is cut off.

Figure 12:
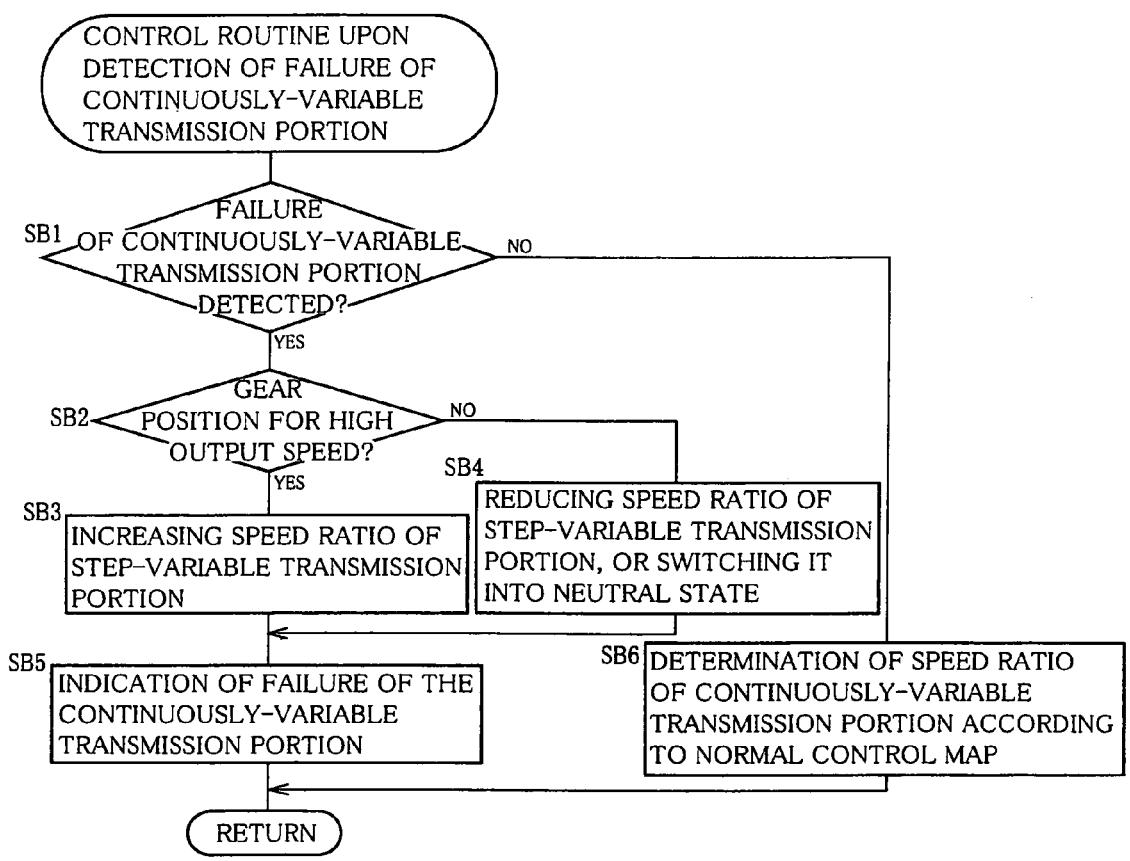
FIG. 12 is a flow chart illustrating a control routine executed by electronic control device of FIG. 5, for permitting running of the vehicle upon detection of a failure of the continuously-variable transmission portion.
Figure 14:
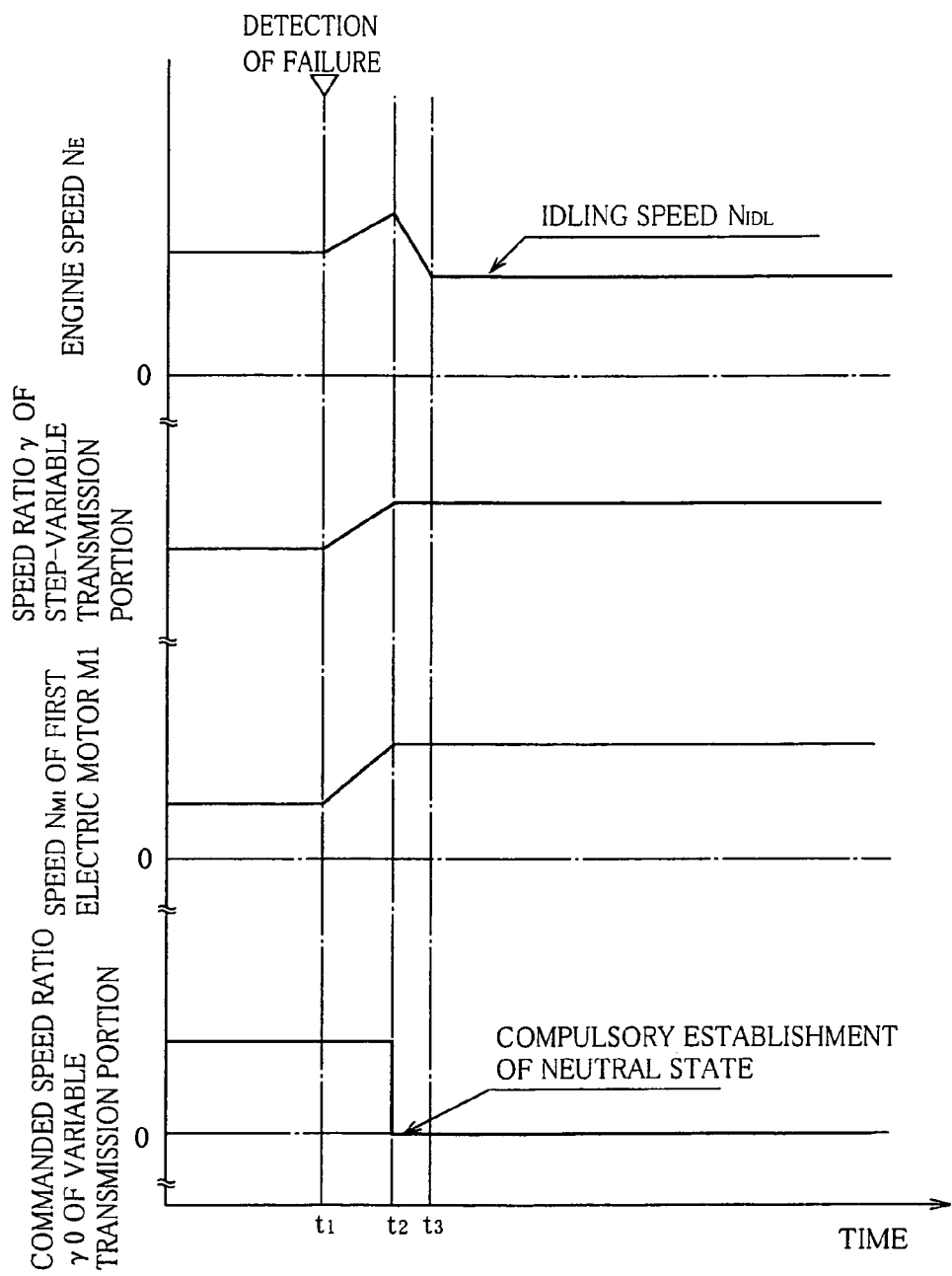
FIG. 14 is a time chart for exhibiting the control routine illustrated in the flow chart of FIG. 12, that is, a control operation to increase the speed ratio of the step-variable transmission portion, upon detection of a failure of the continuously-variable transmission portion, which causes a shift-up action of the continuously-variable transmission portion.

Referring to the flow chart of FIG. 12, there is illustrated a major control operation of the electronic control device 40, that is, a control routine to assure high drivability of the vehicle when the continuously-variable transmission portion 11 (indicated as "continuously-variable transmission portion" in FIG. 12) is in the faulty state. This control routine is repeatedly executed with an extremely short cycle time form about several milliseconds to about several tens of milliseconds. FIG. 12 is a time chart for explaining an example of the control routine illustrated in the flow chart of FIG. 12, that is, a control operation to reduce the speed ratio γ of the step-variable transmission portion 20 (indicated as "step-variable transmission portion" in FIG. 12), upon detection of the faulty state of the step-variable transmission portion 20, which causes a shift-up action of the continuously-variable transmission portion 11 to the gear position for a relatively high output speed, while FIG. 14 is a time chart for explaining another example of the control routine illustrated in the flow chart of FIG. 12, that is, a control operation to place the step-variable transmission portion 20 in its neutral state, upon detection of the faulty state of the continuously-variable transmission portion 11, which causes a shift-down action of the continuously-variable transmission portion 11 to the gear position for the relatively low output speed.

Figure 13:
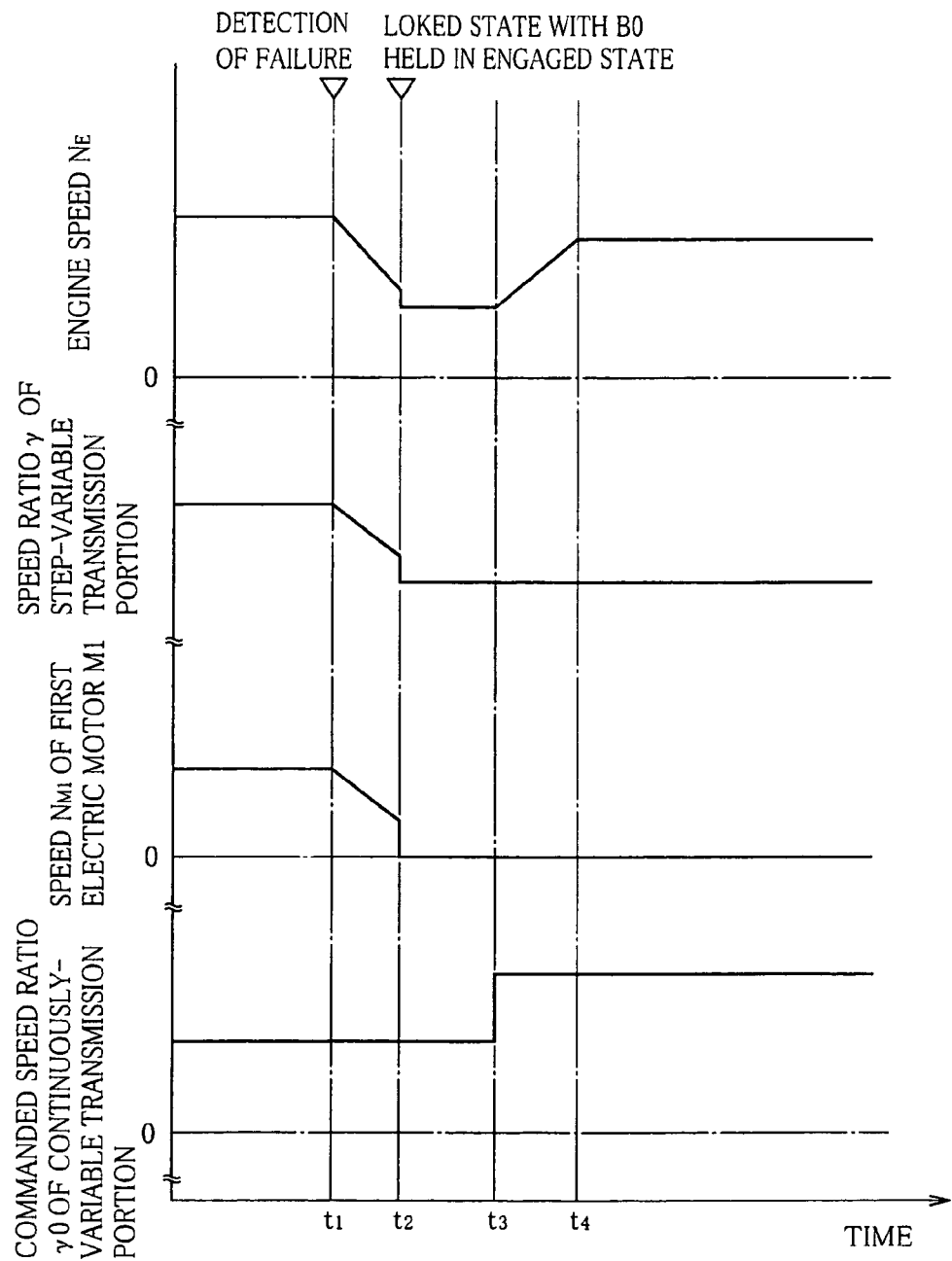
FIG. 13 is a time chart for explaining the control routine illustrated in the flow chart of FIG. 12, that is, a control operation to increase the speed ratio of the step-variable transmission portion, upon detection of a failure of the continuously-variable transmission portion, which causes a shift-up action of the continuously-variable transmission portion to a higher speed position.

The control routine is initiated with step SB1 ("step" being hereinafter omitted) corresponding to the transmission-failure detecting means 80, to determine whether the continuously-variable transmission portion 11 is in the faulty state. For example, this determination is made by determining whether at least one of the first electric motor M1 and the second electric motor M2 is not normally operable. In the examples of FIGS. 13 and 14, the faulty state of the continuously-variable transmission portion 11 is detected at a point of time t1.

If a negative decision is obtained in SBA1, the control flow goes to SB6 to perform normal control operations other than the control operation to be performed to assure high drivability of the vehicle upon detection of the continuously-variable transmission portion 11, for example, control operations to shift the step-variable transmission portion 20 or maintain its present gear position under the control of the step-variable shifting control means 54 according to the shifting boundary line map shown FIG. 6. One cycle of execution of the present control routine is terminated with SB6.

If an affirmative decision is obtained in SB1, the control flow goes to SB2 corresponding to the faulty-transmission speed-ratio determining means 82, to determine the actually established speed ratio γ0 of the continuously-variable transmission portion 11 the faulty state of which has been detected. For example, the faulty-transmission speed-ratio determining means 82 is arranged to determine that the actually established speed ratio γ0 of the continuously-variable transmission portion 11 in the faulty state is the speed ratio for the relatively high output speed, if the speed ratio $\gamma 0(N_E/N_{IN})$ calculated on the basis of the input speed $N_{IN}$ of the step-variable transmission portion 20 and the engine speed NE is lower than the speed ratio 0 immediately before the continuously-variable transmission portion 11 fails to be normally operable.

If an affirmative decision is obtained in SB2, the control flow goes to SB3 corresponding to the emergency transmission control means 84, to command the step-variable shifting control means 54 to increase the speed ratio γ of the step-variable transmission portion 20, for thereby assuring running of the vehicle with a sufficient drive force. For example, the step-variable shifting control means 54 is commanded to increase the speed ratio γ by such a ratio as to change the actual overall speed ratio γT of the transmission mechanism 10 to a value as close as possible to the value immediately before the continuously-variable transmission portion 11 fails to be normally operable. In the example of FIG. 13, the speed ratio γ of the step-variable transmission portion 20 is held in the increased state during a time period from a point of time t3 to a point of time t4, under the control of the step-variable shifting control means 54 according to the command from the emergency transmission control means 84.

In the example of FIG. 13, the engine speed $N_E$ is lowered during a time period from the point of time t1 to a point of time t2, as a result of a shift-up action of the continuously-variable transmission portion 11 to the gear position for the relatively high output speed, which shift-up action takes place when the continuously-variable transmission portion 11 fails to be normally operable. Upon determination that the continuously-variable transmission portion 11 in the faulty state has the speed ratio γ0 for the relatively high output speed, the step-variable transmission portion 20 is shifted down to increase its speed ratio γ at the point of time t3 indicated in FIG. 13, so that the actual overall speed ratio γT of the transmission portion 10 is made as close as possible to the value immediately before the continuously-variable transmission portion 11 fails to be normally operable. During the time period following the point of time t3 indicated in FIG. 13, the engine speed $N_E$ is held closer to the engine speed $N_E$ during the time period before the point of time t1, than the engine speed $N_E$ during the time period from the point of time t2 to the point of time t3 after the shift-up action. In the example of FIG. 13, the switching brake B0 is engaged at the point of time t3, to hold the speed ratio γ0 of the continuously-variable transmission portion 11 at a fixed value of about 0.7. With the speed ratio γ0 of the continuously-variable transmission portion 11 thus held constant, the speed ratio γ0 in the faulty state of the continuously-variable transmission portion 11 can be accurately detected, so that the overall speed ratio γT can be adequately controlled under the control of the emergency transmission control means 84.

If a negative decision is obtained in SB2, the control flow goes to SB4 corresponding to the emergency transmission control means 84, to command the step-variable shifting control means 54 to reduce the speed ratio γ of the step-variable transmission portion 20, for thereby reducing an amount of increase of the vehicle drive force or the engine braking effect. For example, the step-variable shifting control means 54 is commanded to reduce the speed ratio γ by such a ratio as to change the actual overall speed ratio γT of the transmission mechanism 10 to a value as close as possible to the value immediately before the continuously-variable transmission portion 11 fails to be normally operable. According to the command from the emergency transmission control means 84, the step-variable shifting control means 54 controls the ratio of reduction of the speed ratio γ of the step-variable transmission portion 20.

The step-variable shifting control means 54 may be commanded, in the step SB4, to temporarily place the step-variable transmission portion 20 in its neutral state, for preventing an increase of the vehicle drive force or generation of an engine braking effect, in place of reducing the speed ratio γ of the step-variable transmission portion 20. In the example of FIG. 14, the step-variable transmission portion 20 is held in the neutral state under the control of the step-variable shifting control means 54, during the time period after the point of time t2.

In the example of FIG. 14, the engine speed $N_E$ is raised during a time period from the point of time t1 to a point of time t2, as a result of a shift-down action of the continuously-variable transmission portion 11 to establish the speed ratio γ0 for the relatively low output speed, which shift-down action takes place when the continuously-variable transmission portion 11 fails to be normally operable. At the point of time t2 following the determination that the speed ratio γ0 for the relatively low output speed is established in the continuously-variable transmission portion 11 in the faulty state, the first clutch C1 and the clutch C2 are both released under the control of the step-variable shifting control means 54, so that the step-variable transmission portion 20 is placed in the neutral state in which the path of power transmission through the step-variable transmission portion 20 is cut off. After the point of time t2 in FIG. 14 at which the step-variable transmission portion 20 is switched into the neutral state, the engine 8 is held in a non-load state, and the engine speed $N_E$ is freely changeable. For example, the engine speed $N_E$ is held at an idling speed $N_{IDL}$. The step-variable transmission portion 20 is held in the neutral state only temporarily, (although this temporal neutralization is not indicated in FIG. 14), so as to permit the vehicle to be driven again. For instance, the step-variable transmission portion 20 is switched from the neutral state back to the original operating state when the vehicle speed V has been lowered to a value at which the engine braking effect is relatively small.

The above-described steps SBA3 and SB4 are followed by SB5 corresponding to the faulty-state indicating means 86, to activate the faulty-state indicator device 90 to indicate that the continuously-variable transmission portion 11 is in the faulty state.

In the present embodiment wherein the transmission mechanism 10 includes the continuously-variable transmission portion 11 and the step-variable transmission portion 20, the emergency transmission control means 84 is operated when the continuously-variable transmission portion 11 fails to be normally operable, so that the speed ratio γ of the step-variable transmission portions 20 is changed by the emergency transmission control means 84. Accordingly, the emergency transmission control means 84 reduces a change of the overall speed ratio γT of the transmission mechanism 10 determined by the speed ratio γ0 of the continuously-variable transmission portion 11 and the speed ratio γ of the step-variable transmission portion 20, thereby assuring high drivability of the vehicle.

The emergency transmission control means 84 in the present embodiment is further arranged to increase the speed ratio γ of the step-variable transmission portion 20 if the speed ratio of the continuously-variable transmission portion 11 has changed to a value for a relatively high output speed due to a failure of the continuously-variable transmission portion 11. Accordingly, an amount of change of the overall speed ratio γT of the transmission mechanism 10 to a value for a relatively high output speed is reduced, so that the vehicle can be run with a sufficient drive force. For example, the emergency transmission control means 84 increases the speed ratio γ of the step-variable transmission portion 20 for thereby changing the overall speed ratio γT to a value immediately before detection of the faulty state of the continuously-variable transmission portion 11, making it possible to reduce an amount of reduction of the vehicle drive torque due to the change of the speed ratio of the continuously-variable transmission portion 11 to the value for the relatively high output speed, so that the vehicle can be run with high drivability.

The emergency transmission control means 84 in the present embodiment is further arranged to reduce the speed ratio γ of the step-variable transmission portion 20 if the speed ratio of the continuously-variable transmission portion 11 has changed to a value for a relatively low output speed due to the failure of the continuously-variable transmission portion 11. Accordingly, an amount of change of the overall speed ratio γT of the transmission mechanism 10 to a value for a relatively low output speed is reduced, so that an amount of increase of the vehicle drive force or the engine braking effect can be reduced. For example, the emergency transmission control means 84 reduces the speed ratio γ of the step-variable transmission portion 20 for thereby changing the overall speed ratio γT to a value immediately before detection of the faulty state of the continuously-variable transmission portion 11, making it possible to reduce the engine braking effect due to the change of the speed ratio of the continuously-variable transmission portion 11 to the value for the relatively low output speed, so that the vehicle can be run with high drivability (high stability).

In the present embodiment wherein the transmission mechanism 10 includes the continuously-variable transmission portion 11 and the step-variable transmission portion 20, the emergency transmission control means 84 is operated upon detection of the faulty state of the continuously-variable transmission portion 11, to place the step-variable transmission portion 20 in its neutral state in which the path of power transmission through the step-variable transmission portion 20 is cut off. Thus, the emergency transmission control means 84 is effective to prevent generation of an engine braking effect due to the change of the speed ratio of the continuously-variable transmission portion 11 in the faulty state.

Embodiment 3

Figures 15, 16:
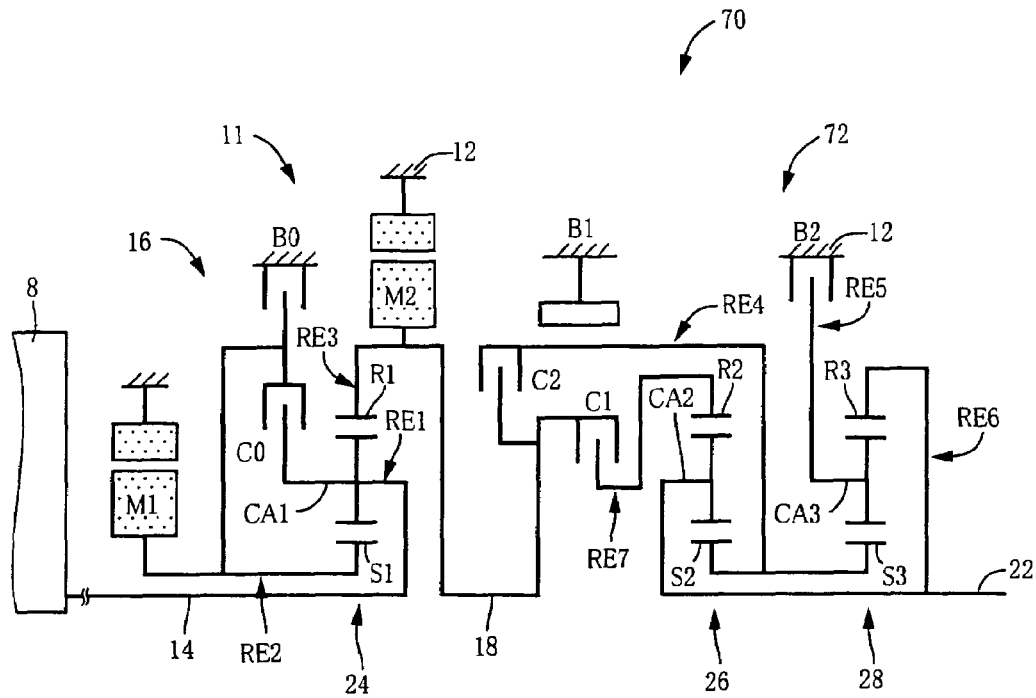
FIG. 15 is a schematic view corresponding to that of FIG. 1, showing an arrangement of a drive system for a hybrid vehicle, which is constructed according to another embodiment of the present invention.
FIG. 16 is a table corresponding to that of FIG. 2, indicating shifting actions of the hybrid vehicle drive system of the embodiment of FIG. 15, which is operable in a selected one of the continuously-variable shifting state and the step-variable shifting state, in relation to different combinations of the operating states of the hydraulically operated frictional coupling devices to effect the respective shifting actions.
Figure 17:
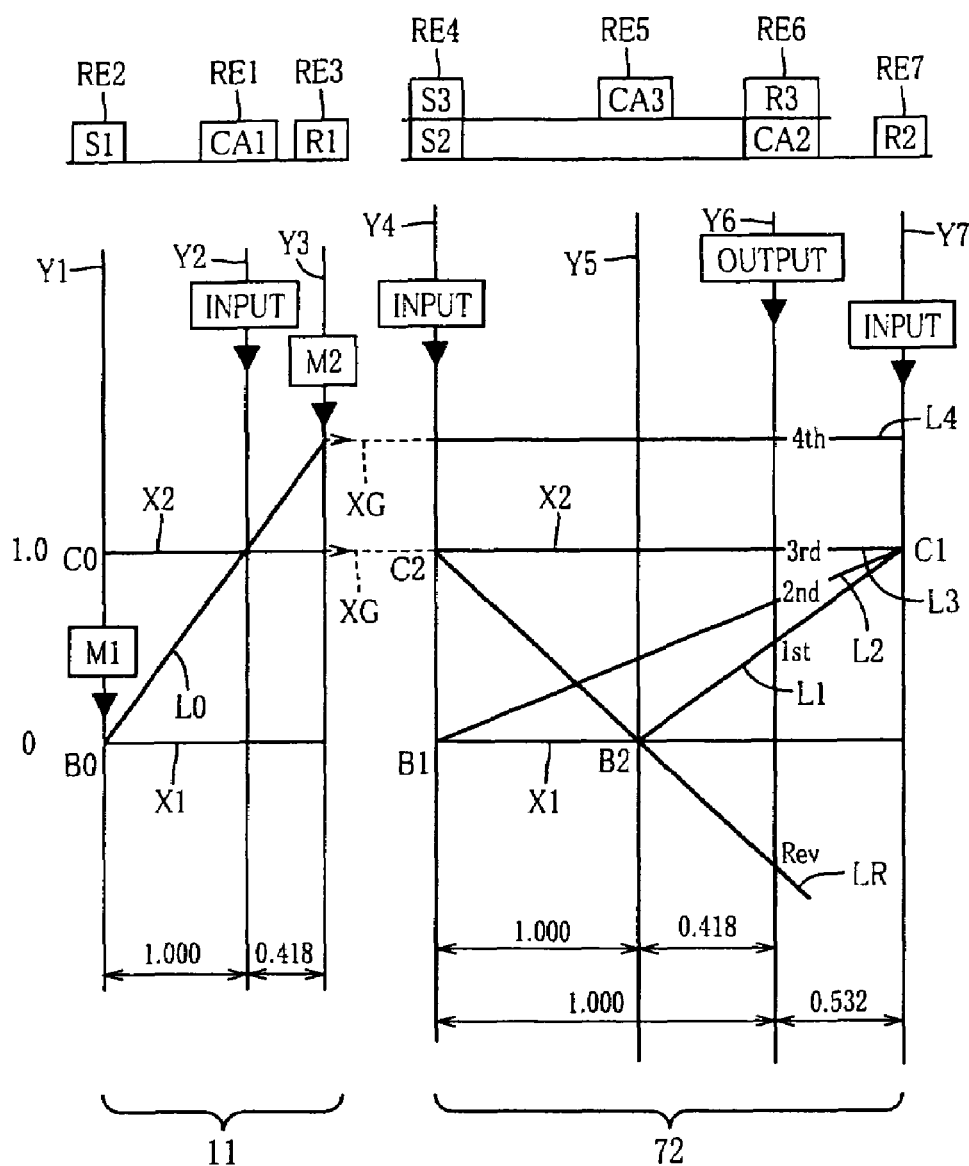
FIG. 17 is a collinear chart corresponding to that of FIG. 3, indicating relative rotating speeds of the rotary elements of the drive system of the hybrid vehicle drive system of the embodiment of FIG. 15 in the different gear positions of the drive system.

FIG. 15 is a schematic view showing an arrangement of a transmission mechanism 70 according to a further embodiment of the present invention, and FIG. 16 is a table indicating gear positions of the transmission mechanism 70, and different combinations of engaged states of the hydraulically operated frictional coupling devices for respectively establishing those gear positions, while FIG. 17 is a collinear chart for explaining a shifting operation of the transmission mechanism 70.

The transmission mechanism 70 includes the continuously-variable transmission portion 11 having the first electric motor Ml, power distributing mechanism 16 and second electric motor M2, as in the first embodiment. The transmission mechanism 70 further includes a step-variable transmission portion 72 having three forward drive positions. The step-variable transmission portion 72 is disposed between the continuously-variable transmission portion 11 and the output shaft 22 and is connected in series to the continuously-variable transmission portion 11 and output shaft 22, through the power transmitting member 18. The power distributing mechanism 16 includes the first planetary gear set 24 of single-pinion type having a gear ratio ρ1 of about 0.418, for example, and the switching clutch C0 and the switching brake B0, as in the preceding embodiments. The step-variable transmission portion 72 includes a single-pinion type second planetary gear set 26 having a gear ratio ρ2 of about 0.532, for example, and a single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the transmission casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch Cl, and the third carrier CA3 is selectively fixed to the transmission casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 16. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as a continuously variable transmission described above. In the present transmission mechanism 70, therefore, a step-variable transmission is constituted by the step-variable transmission portion 20, and the continuously-variable transmission portion 11 which is placed in the fixed-speed-ratio shifting state by engagement of the switching clutch C0 or switching brake B0. Further, a continuously variable transmission is constituted by the step-variable transmission portion 20, and the continuously-variable transmission portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 16. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as shown in the table of FIG. 16, so that the continuously-variable transmission portion 11 functions as the continuously variable transmission, while the step-variable transmission portion 72 connected in series to the continuously-variable transmission portion 11 functions as the step-variable transmission, whereby the speed of the rotary motion transmitted to the step-variable transmission portion 72 placed in one of the first through third gear positions, namely, the rotating speed of the power transmitting member 18 is continuously changed, so that the speed ratio of the transmission mechanism 10 when the step-variable transmission portion 72 is placed in one of those gear positions is continuously variable over a predetermined range. Accordingly, the speed ratio of the step-variable transmission portion 72 is continuously variable across the adjacent gear positions, whereby the overall speed ratio γT of the transmission mechanism 70 is continuously variable.

The collinear chart of FIG. 17 indicates, by straight lines, a relationship among the rotating speeds of the rotary elements in each of the gear positions of the transmission mechanism 70, which is constituted by the continuously-variable transmission portion 11 functioning as the differential portion or first transmission portion, and the step-variable transmission portion 72 functioning as the automatic transmission portion or second transmission portion. The collinear chart indicates the rotating speeds of the individual elements of the continuously-variable transmission portion 11 when the switching clutch C0 and brake B0 are both released, and the rotating speeds of those elements when the switching clutch C0 or brake B0 is engaged, as in the preceding embodiments.

In FIG. 17, four vertical lines Y4, Y5, Y6 and Y7 corresponding to the step-variable transmission portion 72 respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the step-variable transmission portion 72, the fourth rotary element RE4 is selectively connected to the power transmitting member 18 through the second clutch C2, and is selectively fixed to the transmission casing 12 through the first brake B1, and the fifth rotary element RE5 is selectively fixed to the transmission casing 12 through the second brake B2. The sixth rotary element RE6 is fixed to the output shaft 22 of the step-variable transmission portion 72, and the seventh rotary element RE7 is selectively connected to the power transmitting member 18 through the first clutch C1.

When the first clutch C1 and the second brake B2 are engaged, the step-variable transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element P15 (CA3) and the horizontal line X1, as indicated in FIG. 17. Similarly, the rotating speed of the output shaft 22 in the second gear position established by the engaging actions of the first clutch Cl and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the continuously-variable transmission portion 11. When the switching clutch B0 is engaged in place of the switching clutch C0. the sixth rotary element RE6 is rotated at a speed higher than the engine speed $N_E$, with the drive force received from the continuously-variable transmission portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 is also constituted by the continuously-variable transmission portion 11 functioning as the differential portion or first transmission portion, and the step-variable transmission portion 72 functioning as the automatic transmission portion or second transmission portion, so that the present transmission mechanism 70 has advantages similar to those of the first embodiment.

Figure 18:
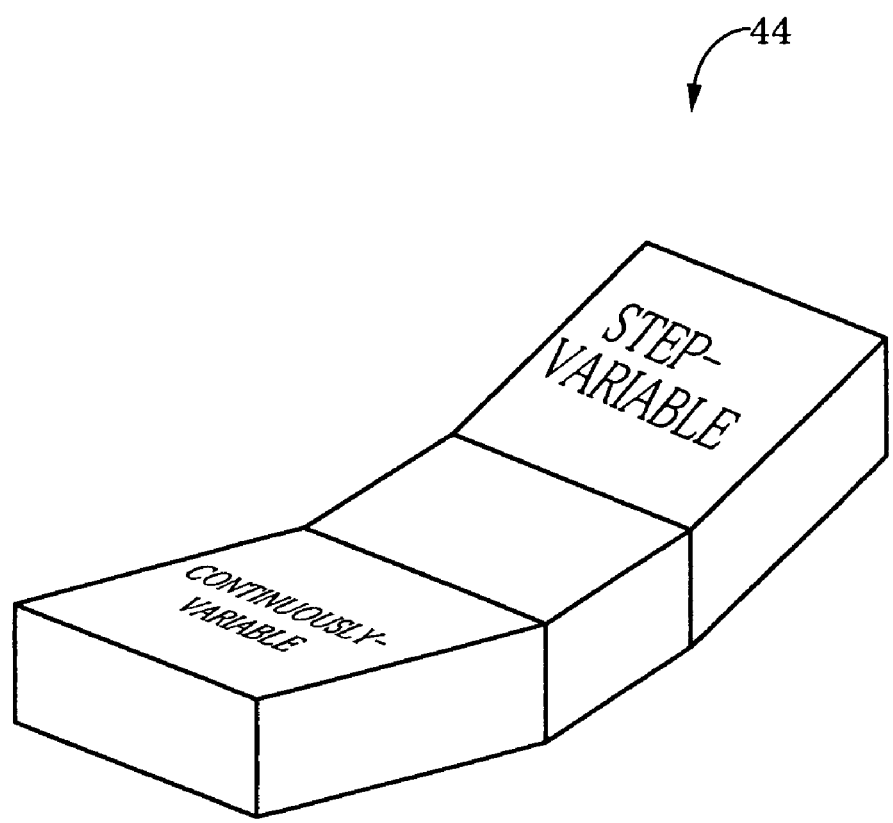
FIG. 18 is a view showing a manually operable shifting-state selecting device in the form of a seesaw switch functioning as a shifting device, the seesaw switch being operated by the user to select the shifting state of the drive system.

FIG. 18 shows an example of a seesaw switch 44 (hereinafter referred to as "switch 44") functioning as a shifting-state selecting device manually operable to select the differential state or the non-differential state (locked state) of the power distributing mechanism 16, that is, to select the continuously-variable shifting state or the step-variable shifting state of the power distributing mechanism 16. The switch 44 is provided on the vehicle such that the switch 44 is manually operable by the user, to select the desired shifting state during running of the vehicle. The switch 44 has a continuously-variable-shifting running pushbutton labeled "CONTINUOUSLY-VARIABLE", and a step-variable-shifting running pushbutton labeled "STEP-VARIABLE", as shown in FIG. 18, and is selectively placed in the continuously-variable shifting position (in which the transmission mechanism 10 is operable as the electrically controlled continuously variable transmission) by depressing the step-variable-shifting running pushbutton, and in the continuously-variable shifting position (in which the transmission mechanism 10 is operable as the step-variable transmission) by depressing the continuously-variable-shifting running pushbutton. In the preceding embodiments, the shifting state of the transmission mechanism 10 is automatically switched on the basis of the detected vehicle condition and according to the switching boundary line map of FIG. 6. However, the shifting state of the transmission mechanism 10 may be manually switched by a manual operation of the switch 44. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user of the vehicle manually operates the switch 44 to place the transmission mechanism 10 in the continuously-variable shifting state when the user likes the transmission mechanism 10 to operate as the continuously variable transmission or wants to improve the fuel economy of the engine, or alternatively in the step-variable shifting state when the user likes a change of the engine speed as a result of a shifting action of the step-variable transmission. Where the switch 44 has a neutral position, the switch 44 is placed in its neutral position when the user has not selected the desired shifting state or likes the transmission mechanism 10 to be automatically placed in one of the continuously-variable and step-variable shifting states.

While the embodiments of the present invention have been described above in detail by reference to the accompanying drawings, it is to be understood that the present invention may be otherwise embodied.

In the preceding embodiments, the emergency transmission control means 84 is arranged to place the continuously-variable transmission portion 11 in its neutral state (in SA4 of FIG. 9) only after the speed ratio of the step-variable transmission portion 20 has changed to the value for the relatively low output speed due to a failure of the step-variable transmission portion 20. However, the emergency transmission control means 84 may be arranged to place the continuously-variable transmission portion 11 when the step-variable transmission portion 20 fails to be normally operable, without implementing the determination (in SA2) by the faulty-transmission speed-ratio determining means 82 as to whether the gear position for the relatively high output speed is actually established in the step-variable transmission portion 20. In this case, the continuously-variable transmission portion 11 is temporarily placed in the neutral state under the control of the emergency transmission control means 84, when the step-variable transmission portion 20 becomes faulty.

In the preceding embodiments, the emergency transmission control means 84 is further arranged to place the step-variable transmission portion 20 in its neutral state (in SB4 of FIG. 12) only after the speed ratio of the continuously-variable transmission portion 11 has changed to the value for the relatively low output speed due to a failure of the continuously-variable transmission portion 11. However, the emergency transmission control means 84 may be arranged to place the step-variable transmission portion 20 when the continuously-variable transmission portion 11 fails to be normally operable, without implementing the determination (in SB2) by the faulty-transmission speed-ratio determining means 82 as to whether the speed ratio $\gamma 0$ for the relatively high output speed is actually established in the continuously-variable transmission portion 11. In this case, the step-variable transmission portion 20 is temporarily placed in the neutral state under the control of the emergency transmission control means 84, when the continuously-variable transmission portion 11 becomes faulty.

In the preceding embodiments, the emergency transmission control means 84 (SA3 and SA4 in FIG. 9) is arranged to command the hybrid control means 52 to change the speed ratio $\gamma 0$ of the continuously-variable transmission portion 11 such that the overall speed ratio $\gamma T$ of the transmission mechanism 10 changes toward the value immediately before the step-variable transmission portion 20 fails to be normally operable. However, the emergency transmission control means 84 may be arranged to hold the speed ratio $\gamma 0$ of the continuously-variable transmission portion 11 at its highest value in SA3 in FIG. 9, to minimize a change of the overall speed ratio $\gamma T$ to a value for a relatively high output speed, when the gear position for the relatively high output speed is established in the step-variable transmission portion in the faulty state, and to hold the speed ratio $\gamma 0$ of the continuously-variable transmission portion 11 at its lowest value (speed ratio of the overdrive position) in SA4 in FIG. 9, to minimize a change of the overall speed ratio $\gamma T$ to a value for a relatively low output speed, when the gear position for the relatively low output speed is established in the step-variable transmission portion in the faulty state. This arrangement assures drivability of the vehicle to some extent.

In the preceding embodiments, the emergency transmission control means 84 (SB4 in FIG. 12) is further arranged to command the step-variable shifting control means 54 to change the speed ratio $\gamma$ of the step-variable transmission portion 20 such that the overall speed ratio $\gamma T$ of the transmission mechanism 10 changes toward the value immediately before the continuously-variable transmission portion 11 fails to be normally operable. However, the emergency transmission control means 84 may be arranged to hold the speed ratio $\gamma$ of the step-variable transmission portion 20 at its lowest value (speed ratio of the fourth gear position), to minimize a change of the overall speed ratio $\gamma T$ to a value for a relatively low output speed. This arrangement assures drivability of the vehicle to some extent.

In the illustrated embodiments, the transmission mechanism 10, 70 is placed selectively in one of the continuously-variable and step-variable shifting states, when the continuously-variable transmission portion 11 (power distributing portion 16) is placed selectively in its differential state in which the continuously-variable transmission portion 11 is operable as the electrically controlled continuously variable transmission, and in its non-differential state (locked state) in which the continuously-variable transmission portion 11 is not operable as the electrically controlled continuously variable transmission. However, the transmission mechanism 10, 70 may function as the step-variable transmission while the speed ratio of the continuously-variable transmission portion 11 is variable in steps rather than continuously, while this transmission portion 11 remains in the differential state. In other words, the differential and non-differential states of the continuously-variable transmission portion 11 need not respectively correspond to the continuously-variable and step-variable shifting states of the transmission mechanism 10, 70, and the continuously-variable transmission portion 11 need not be switchable between the continuously-variable and step-variable shifting states. The principle of the present invention is applicable to any transmission mechanism (its continuously-variable transmission portion 11 or power distributing mechanism 16) which is switchable between the differential state and the non-differential state.

In the illustrated embodiments, the continuously-variable transmission portion 11 is placed selectively in its continuously-variable shifting state or in its fixed-speed-ratio shifting state, to place the transmission mechanism 10, 70 selectively in one of the continuously-variable shifting state in which the continuously-variable transmission portion 11 functions as the electrically controlled continuously variable transmission, and the step-variable shifting state in which the continuously-variable transmission portion 11 functions as the step-variable transmission. However, the principle of the present invention is applicable to a transmission mechanism which cannot be switched to the step-variable shifting state, namely, to a transmission mechanism the continuously-variable transmission portion 11 of which is not provided with the switching clutch C0 and switching brake B0 and functions only as the electrically controlled continuously variable transmission (electrically controlled differential device).

While the step-variable transmission portion 20, 72 is connected in series to the continuously-variable transmission portion 11 through the power transmitting member 18 in the illustrated embodiments, the step-variable transmission portion 20, 72 may be mounted on and disposed coaxially with a counter shaft which is parallel to the input shaft 14. In this case, the continuously-variable transmission portion 11 and the step-variable transmission portion 20, 72 are operatively connected to each other through a suitable power transmitting device or a set of two power transmitting members such as a pair of counter gears, and a combination of a sprocket wheel and a chain.

The transmission mechanism 10, 70 in the preceding embodiments is constituted by the continuously-variable transmission portion 11 functioning as a first transmission portion, and the step-variable transmission portion 20 functioning as a second transmission portion. However, the transmission mechanism 10, 70 need not be constituted by the continuously-variable transmission portion 11 and the step-variable transmission portion 20. For instance, the transmission mechanism 10, 70 may be constituted by the continuously-variable transmission portion 11 functioning as the second transmission portion, and a power transmitting device of any other type functioning as the second transmission portion, such as an automatic transmission in the form of a continuously variable transmission (CVT). Alternatively, the transmission mechanism 10, 70 may be constituted by a step-variable automatic transmission functioning as the first transmission portion, and a step-variable automatic transmission functioning as the second transmission portion. In summary, the principle of the present invention is applicable to the transmission mechanism 10, 70 which is a drive system including the first transmission portion and the second transmission portion the speed ratios of which are variable independently of each other.

Where the continuously variable transmission (CVT) is provided, the transmission mechanism as a whole is placed in the step-variable shifting state when the power distributing mechanism 16 is placed in the fixed-speed-ratio shifting state. The fixed-speed-ratio shifting state is defined as a state in which power is transmitted primarily through a mechanical power transmitting path, without power transmission through an electric path. The continuously variable transmission may be arranged to establish a plurality of predetermined fixed speed ratios corresponding to those of the gear positions of the step-variable transmission portion 20, 72, under the control of a step-variable shifting control portion which stores data indicative of the predetermined speed ratios.

In the preceding embodiments, the coupling devices in the form of the first clutch C1 and second clutch C2 which constitute a part of the step-variable transmission portion 20, 70 are provided to place the power transmitting path in the power-cutoff state for placing the step-variable transmission portion 20, 70 in its neutral state. These first clutch C1 and second clutch C2 are disposed between the step-variable transmission portion 20, 72 and the differential portion 11. However, the power transmitting path need not be placed in the power-cutoff state, by the first clutch C1 and second clutch C2, as long as at least one coupling device is provided for this purpose. For example, the at least one coupling device may be connected to the output shaft 22 or to a rotary member or members of the step-variable transmission portion 20, 70. Further, the at least one coupling device need not constitute a part of the step-variable transmission portion 20, 70, and may be provided separately from the step-variable transmission portion 20, 70. Where the step-variable transmission portion 20, 70 is the continuously variable transmission (CVT), the at least one coupling device may be disposed in the power transmitting path between the power transmitting member 18 and the drive wheels 38, so that the power transmitting path is switched to the power-cutoff state and consequently to the neutral state, when the at least one coupling device is released.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears or belts.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

In the illustrated embodiments, the second electric motor M2 is fixed to the power transmitting member 18. However, the second electric motor M2 may be fixed to the output shaft 22 or to a rotary member of the step-variable transmission portion 20, 72.

The power distributing mechanism 16 provided as a differential mechanism in the illustrated embodiments may be replaced by a differential gear device including a pinion rotated by the engine 8, and a pair of bevel gears which are respectively operatively connected to the first and second electric motors M1, M2.

Although the power distributing mechanism 16 is constituted by one planetary gear set in the illustrated embodiments, the power distributing mechanism 16 may be constituted by two or more planetary gear sets and arranged to be operable as a transmission having three or more gear positions when placed in its non-differential state (fixed-speed-ratio shifting state).

While the switch 44 is of a seesaw type switch in the preceding embodiment, the switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). Where the switch 44 does not have a neutral position, an additional switch may be provided to enable and disable the switch 44. A device not operated by hand but operated in response to a voice of the vehicle operator or operated by foot may be provided in place of, or in addition to the switch 44, to select one of the continuously-variable shifting state (differential state) and the step-variable shifting state (non-differential state).

The faulty-state indicating device 90 provided in the illustrated embodiments may be arranged to inform the user of the faulty-state of the transmission portions in any manner. The principle of the present invention is applicable to a control device which is not provided with the faulty-state indicating device 90 and which is not arranged to inform the user of the faulty state of the transmission portions, namely, applicable to a control device which is not provided with the faulty-state indicator means 86 and which is not arranged to implement the step SA5 of FIG. 8 and the step SB5 of FIG. 12.

While the embodiments of the present invention have been described for illustrative purpose only, it is to be understood that the present invention may be embodied with various changes and improvements which may occur to those skilled in the art.

8: Engine (Drive power source)
10, 70: Transmission mechanism (Drive system)
11: Continuously-variable transmission portion (First transmission portion)
16: Power distributing mechanism (Differential mechanism)
20, 72: Step-variable transmission portion (Second transmission portion)
38: Drive wheels
84: Emergency transmission control means
M1: First electric motor
M2: Second electric motor

What is claimed is:

1. A control device for a vehicular drive system including a first transmission portion and a second transmission portion and operable to transmit an output of a drive power source to a drive wheel of a vehicle through said first and second transmission portions, said control device comprising:
    emergency transmission control means operable when one of said first and second transmission portions fails to be normally operable, said emergency transmission control means changing a speed ratio of the other of said first and second transmission portions,
    wherein at least said first transmission portion is a continuously variable transmission,
    wherein a speed ratio of said first transmission portion and a speed ratio of said second transmission portion determine an overall speed ratio of the vehicular drive system,
    and wherein said emergency transmission control means changes the speed ratio of said other transmission portion such that said overall speed ratio of the vehicular drive system changes toward a value immediate before said one transmission portion fails to be normally operable.

2. A control device for a vehicular drive system including a first transmission portion and a second transmission portion and operable to transmit an output of a drive power source to a drive wheel of a vehicle through said first and second transmission portions, said control device comprising:
    emergency transmission control means operable when one of said first and second transmission portions fails to be normally operable, said emergency transmission control means placing the other of said first and second transmission portions in a neutral state in which a path of power transmission through said other transmission portion is cut off.

3. A control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between said power transmitting member and a drive wheel of a vehicle, and further including a step-variable transmission portion which constitutes a part of said power transmitting path and which functions as a step-variable automatic transmission, said control device comprising:
    emergency transmission control means operable when one of said continuously-variable and step-variable transmission portions fails to be normally operable, said emergency transmission control means changing a speed ratio of the other of said continuously-variable and step-variable transmission portions.

4. The control device according to claim 3, wherein a speed ratio of said continuously-variable transmission portion and a speed ratio of said step-variable transmission portion determine an overall speed ratio of the vehicular drive system,
    and wherein said emergency transmission control means changes the speed ratio of said other transmission portion such that said overall speed ratio of the vehicular drive system changes toward a value immediate before said one transmission portion fails to be normally operable.

5. The control device according to claim 3, wherein said differential mechanism includes a differential-state switching device operable to place the differential mechanism selectively into a continuously-variable shifting state in which said continuously-variable transmission portion is operable as said electrically controlled continuously variable transmission, and a step-variable shifting state in which the continuously-variable transmission portion is not operable as the electrically controlled continuously variable transmission.

6. The control device according to claim 5, wherein said differential mechanism further including a first element fixed to said engine, a second element fixed to said first electric motor, and a third element fixed to said power transmitting member, and said differential state switching device is operable to permit said first, second and third elements to be rotated relative to each other, for thereby placing said differential mechanism in said continuously-variable shifting state, and to connect the first, second and third elements for rotation as a unit or to hold the second element stationary, for thereby placing the differential mechanism in said step-variable shifting state.

7. The control device according to claim 6, wherein said differential-state switching device includes a clutch operable to connect at least two of said first, second and third elements to each other for rotation of the first, second and third elements as a unit, and/or a brake operable to fix the second element to a stationary member for holding the second element stationary.

8. The control device according to claim 7, wherein said differential-state switching device includes both of said clutch and said brake, and is operable to release said clutch and said brake for thereby placing said differential mechanism in said continuously-variable shifting state, and to engage said clutch and release said brake for thereby enabling said differential mechanism to function as a transmission having a speed ratio of 1, or engage said brake and release said brake for thereby enabling the differential mechanism to function as a speed-increasing transmission having a speed ratio lower than 1.

9. The control device according to claim 6, wherein said differential mechanism is a planetary gear set, and said first, second and third elements are respectively a carrier, a sun gear and a ring gear of said planetary gear set.

10. The control device according to claim 9, wherein said planetary gear set is of a single-pinion type.

11. A control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between said power transmitting member and a drive wheel of a vehicle, and further including a step-variable transmission portion which constitutes a part of said power transmitting path and which functions as a step-variable automatic transmission, said control device comprising:

emergency transmission control means operable when one of said continuously-variable and step-variable transmission portions fails to be normally operable, said emergency transmission control means placing the other of said continuously-variable and step-variable transmission portions in a neutral state in which a path of power transmission through said other transmission portion is cut off.

12. The control device according to claim 11, wherein said differential mechanism includes a differential-state switching device operable to place the differential mechanism selectively into a continuously-variable shifting state in which said continuously-variable transmission portion is operable as said electrically controlled continuously variable transmission, and a step-variable shifting state in which the continuously-variable transmission portion is not operable as the electrically controlled continuously variable transmission.

13. The control device according to claim 12 wherein said differential mechanism further including a first element fixed to said engine, a second element fixed to said first electric motor, and a third element fixed to said power transmitting member, and said differential state switching device is operable to permit said first, second and third elements to be rotated relative to each other, for thereby placing said differential mechanism in said continuously-variable shifting state, and to connect the first, second and third elements for rotation as a unit or to hold the second element stationary, for thereby placing the differential mechanism in said step-variable shifting state.

14. The control device according to claim 13, wherein said differential-state switching device includes a clutch operable to connect at least two of said first, second and third elements to each other for rotation of the first, second and third elements as a unit, and/or a brake operable to fix the second element to a stationary member for holding the second element stationary.

15. The control device according to claim 14, wherein said differential-state switching device includes both of said clutch and said brake, and is operable to release said clutch and said brake for thereby placing said differential mechanism in said continuously-variable shifting state, and to engage said clutch and release said brake for thereby enabling said differential mechanism to function as a transmission having a speed ratio of 1, or engage said brake and release said brake for thereby enabling the differential mechanism to function as a speed-increasing transmission having a speed ratio lower than 1.

16. The control device according to claim 13, wherein said differential mechanism is a planetary gear set, and said first, second and third elements are respectively a carrier, a sun gear and a ring gear of said planetary gear set.

17. The control device according to claim 16, wherein said planetary gear set is of a single-pinion type.

18. A control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between said power transmitting member and a drive wheel of a vehicle, and further including a step-variable transmission portion which constitutes a part of said power transmitting path and which functions as a step-variable automatic transmission, said control device being characterized by comprising emergency transmission control means operable when said continuously-variable transmission portion fails to be normally operable, said emergency transmission control means changing a speed ratio of said step-variable transmission portion.

19. The control device according to claim 18, wherein said emergency transmission control means increases the speed ratio of said step-variable transmission portion when said continuously-variable transmission portion fails to be normally operable, with a result of a change of a speed ratio of the continuously-variable transmission portion to a value for a relatively high output speed.

20. The control device according to claim 18, wherein said emergency transmission control means reduces the speed ratio of said step-variable transmission portion when said continuously-variable transmission portion fails to be normally operable, with a result of a change of a speed ratio of the continuously-variable transmission portion to a value for a relatively low output speed.

21. The control device according to claim 18, wherein said differential mechanism includes a differential-state switching device operable to place the differential mechanism selectively into a continuously-variable shifting state in which said continuously-variable transmission portion is operable as said electrically controlled continuously variable transmission, and a step-variable shifting state in which the continuously-variable transmission portion is not operable as the electrically controlled continuously variable transmission.

22. The control device according to claim 21, wherein said differential mechanism further including a first element fixed to said engine, a second element fixed to said first electric motor, and a third element fixed to said power transmitting member, and said differential state switching device is operable to permit said first, second and third elements to be rotated relative to each other, for thereby placing said differential mechanism in said continuously-variable shifting state, and to connect the first, second and third elements for rotation as a unit or to hold the second element stationary, for thereby placing the differential mechanism in said step-variable shifting state.

23. The control device according to claim 22, wherein said differential-state switching device includes a clutch operable to connect at least two of said first, second and third elements to each other for rotation of the first, second and third elements as a unit, and/or a brake operable to fix the second element to a stationary member for holding the second element stationary.

24. The control device according to claim 23, wherein said differential-state switching device includes both of said clutch and said brake, and is operable to release said clutch and said brake for thereby placing said differential mechanism in said continuously-variable shifting state, and to engage said clutch and release said brake for thereby enabling said differential mechanism to function as a transmission having a speed ratio of 1, or engage said brake and release said brake for thereby enabling the differential mechanism to function as a speed-increasing transmission having a speed ratio lower than 1.

25. The control device according to claim 22, wherein said differential mechanism is a planetary gear set, and said first, second and third elements are respectively a carrier, a sun gear and a ring gear of said planetary gear set.

26. The control device according to claim 25, wherein said planetary gear set is of a single-pinion type.

27. The control device according to claim 18, wherein said vehicular drive system has an overall speed ratio which is determined by a speed ratio of said step-variable transmission portion and a speed ratio of said continuously-variable transmission portion.

28. A control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between said power transmitting member and a drive wheel of a vehicle, and further including a step-variable transmission portion which constitutes a part of said power transmitting path and which functions as a step-variable automatic transmission, said control device being characterized by comprising:
  emergency transmission control means operable when said continuously-variable transmission portion fails to be normally operable, said emergency transmission control means placing said step-variable transmission portion in a neutral state in which a path of power transmission through said step-variable transmission portion is cut off.

29. The control device according to claim 28, wherein said differential mechanism includes a differential-state switching device operable to place the differential mechanism selectively into a continuously-variable shifting state in which said continuously-variable transmission portion is operable as said electrically controlled continuously variable transmission, and a step-variable shifting state in which the continuously-variable transmission portion is not operable as the electrically controlled continuously variable transmission.

30. The control device according to claim 29, wherein said differential mechanism further including a first element fixed to said engine, a second element fixed to said first electric motor, and a third element fixed to said power transmitting member, and said differential state switching device is operable to permit said first, second and third elements to be rotated relative to each other, for thereby placing said differential mechanism in said continuously-variable shifting state, and to connect the first, second and third elements for rotation as a unit or to hold the second element stationary, for thereby placing the differential mechanism in said step-variable shifting state.

31. The control device according to claim 30, wherein said differential-state switching device includes a clutch operable to connect at least two of said first, second and third elements to each other for rotation of the first, second and third elements as a unit, and/or a brake operable to fix the second element to a stationary member for holding the second element stationary.

32. The control device according to claim 31, wherein said differential-state switching device includes both of said clutch and said brake, and is operable to release said clutch and said brake for thereby placing said differential mechanism in said continuously-variable shifting state, and to engage said clutch and release said brake for thereby enabling said differential mechanism to function as a transmission having a speed ratio of 1, or engage said brake and release said clutch for thereby enabling the differential mechanism to function as a speed-increasing transmission having a speed ratio lower than 1.

33. The control device according to claim 30, wherein said differential mechanism is a planetary gear set, and said first, second and third elements are respectively a carrier, a sun gear and a ring gear of said planetary gear set.

34. The control device according to claim 28, wherein said vehicular drive system has an overall speed ratio which is determined by a speed ratio of said step-variable transmission portion and a speed ratio of said continuously-variable transmission portion.

35. The control device according to claim 34, wherein said planetary gear set is of a single-pinion type.

36. A control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between said power transmitting member and a drive wheel of a vehicle, and further including a step-variable transmission portion which constitutes a part of said power transmitting path and which functions as a step-variable automatic transmission, said control device being characterized by comprising
  emergency transmission control means operable when said step-variable transmission portion fails to be normally operable, said emergency transmission control means changing a speed ratio of said continuously-variable transmission portion.

37. The control device according to claim 36, wherein said emergency transmission control means increases the speed ratio of said continuously-variable transmission portion when said continuously-variable transmission portion fails to be normally operable, with a result of a change of a speed ratio of the step-variable transmission portion to a value for a relatively high output speed.

38. The control device according to claim 36, wherein said emergency transmission control means reduces the speed ratio of said continuously-variable transmission portion when said step-variable transmission portion fails to be normally operable, with a result of a change of a speed ratio of the step-variable transmission portion to a value for a relatively low output speed.

39. The control device according to claim 36, wherein said differential mechanism includes a differential-state switching device operable to place the differential mechanism selectively into a continuously-variable shifting state in which said continuously-variable transmission portion is operable as said electrically controlled continuously variable transmission, and a step-variable shifting state in which the continuously-variable transmission portion is not operable as the electrically controlled continuously variable transmission.

40. The control device according to claim 39, wherein said differential mechanism further including a first element fixed to said engine, a second element fixed to said first electric motor, and a third element fixed to said power transmitting member, and said differential state switching device is operable to permit said first, second and third elements to be rotated relative to each other, for thereby placing said differential mechanism in said continuously-variable shifting state, and to connect the first, second and third elements for rotation as a unit or to hold the second element stationary, for thereby placing the differential mechanism in said step-variable shifting state.

41. The control device according to claim 40, wherein said differential-state switching device includes a clutch operable to connect at least two of said first, second and third elements to each other for rotation of the first, second and third elements as a unit, and/or a brake operable to fix the second element to a stationary member for holding the second element stationary.

42. The control device according to claim 41, wherein said differential-state switching device includes both of said clutch and said brake, and is operable to release said clutch and said brake for thereby placing said differential mechanism in said continuously-variable shifting state, and to engage said clutch and release said brake for thereby enabling said differential mechanism to function as a transmission having a speed ratio of 1, or engage said brake and release said brake for thereby enabling the differential mechanism to function as a speed-increasing transmission having a speed ratio lower than 1.

43. The control device according to claim 40, wherein said differential mechanism is a planetary gear set, and said first, second and third elements are respectively a carrier, a sun gear and a ring gear of said planetary gear set.

44. The control device according to claim 43, wherein said planetary gear set is of a single-pinion type.

45. The control device according to claim 36, wherein said vehicular drive system has an overall speed ratio which is determined by a speed ratio of said step-variable transmission portion and a speed ratio of said continuously-variable transmission portion.

46. A control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between said power transmitting member and a drive wheel of a vehicle, and further including a step-variable transmission portion which constitutes a part of said power transmitting path and which functions as a step-variable automatic transmission, said control device being characterized by comprising:

emergency transmission control means operable when said step-variable transmission portion fails to be normally operable, said emergency transmission control means placing said continuously-variable transmission portion in a neutral state in which a path of power transmission through said continuously-variable transmission portion is cut off.

47. The control device according to claim 46, wherein said differential mechanism includes a differential-state switching device operable to place the differential mechanism selectively into a continuously-variable shifting state in which said continuously-variable transmission portion is operable as said electrically controlled continuously variable transmission, and a step-variable shifting state in which the continuously-variable transmission portion is not operable as the electrically controlled continuously variable transmission.

48. The control device according to claim 47, wherein said differential mechanism further including a first element fixed to said engine, a second element fixed to said first electric motor, and a third element fixed to said power transmitting member, and said differential state switching device is operable to permit said first, second and third elements to be rotated relative to each other, for thereby placing said differential mechanism in said continuously-variable shifting state, and to connect the first, second and third elements for rotation as a unit or to hold the second element stationary, for thereby placing the differential mechanism in said step-variable shifting state.

49. The control device according to claim 48, wherein said differential-state switching device includes a clutch operable to connect at least two of said first, second and third elements to each other for rotation of the first, second and third elements as a unit, and/or a brake operable to fix the second element to a stationary member for holding the second element stationary.

50. The control device according to claim 49, wherein said differential-state switching device includes both of said clutch and said brake, and is operable to release said clutch and said brake for thereby placing said differential mechanism in said continuously-variable shifting state, and to engage said clutch and release said brake for thereby enabling said differential mechanism to function as a transmission having a speed ratio of 1, or engage said brake and release said brake for thereby enabling the differential mechanism to function as a speed-increasing transmission having a speed ratio lower than 1.

51. The control device according to claim 48, wherein said differential mechanism is a planetary gear set, and said first, second and third elements are respectively a carrier, a sun gear and a ring gear of said planetary gear set.

52. The control device according to claim 51, wherein said planetary gear set is of a single-pinion type.

53. The control device according to claim 46, wherein said vehicular drive system has an overall speed ratio which is determined by a speed ratio of said step-variable transmission portion and a speed ratio of said continuously-variable transmission portion.

* * * * *